United States Patent
Kishi et al.

(10) Patent No.: US 9,739,935 B2
(45) Date of Patent: Aug. 22, 2017

(54) OPTICAL FIBER AND MANUFACTURING METHOD THEREOF

(71) Applicant: FUJIKURA LTD., Tokyo (JP)

(72) Inventors: Tatsuya Kishi, Sakura (JP); Sho Endo, Sakura (JP); Takayuki Kitamura, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

(21) Appl. No.: 15/083,957

(22) Filed: Mar. 29, 2016

(65) Prior Publication Data

US 2016/0209585 A1    Jul. 21, 2016

Related U.S. Application Data

(63) Continuation of application No. PCT/JP2015/071622, filed on Jul. 30, 2015.

(30) Foreign Application Priority Data

Aug. 1, 2014  (JP) .................................. 2014-157571
Sep. 26, 2014  (JP) .................................. 2014-195937
Sep. 26, 2014  (JP) .................................. 2014-195938

(51) Int. Cl.
*G02B 6/028* (2006.01)
*C03B 37/014* (2006.01)
(Continued)

(52) U.S. Cl.
CPC .......... *G02B 6/0281* (2013.01); *C03B 37/014* (2013.01); *C03B 37/018* (2013.01);
(Continued)

(58) Field of Classification Search
CPC  G02B 6/0281; G02B 6/0365; G02B 6/03627; G02B 6/03633; G02B 6/02028; G02B 6/028; C03B 37/018; C03B 2203/22
See application file for complete search history.

(56) References Cited

U.S. PATENT DOCUMENTS 5,504,829 A    4/1996  Evans et al.
6,386,001 B1   5/2002  Shimizu et al.
(Continued)

FOREIGN PATENT DOCUMENTS

EP    0 260 795 A2   3/1988
EP    1397718 B1    10/2004
(Continued)

OTHER PUBLICATIONS

Katsunari Okamoto et al., "Computer-aided synthesis of the optimum refractive-index profile for a multimode fiber", IEEE Transactions on Microwave Throry and Techniques, Mar. 1977, pp. 213-221, vol. MTT-25.
(Continued)

*Primary Examiner* — Ryan Lepisto
(74) *Attorney, Agent, or Firm* — Sughrue Mion, PLLC

(57) ABSTRACT

An optical fiber includes a core, and a clad surrounding an outer circumference of the core, in which a first relative refractive index difference $\Delta 1a$ is greater than 0, a second relative refractive index difference $\Delta 1b$ is greater than 0, the first relative refractive index difference $\Delta 1a$ is greater than the second relative refractive index difference $\Delta 1b$, the first relative refractive index difference $\Delta 1a$ and the second relative refractive index difference $\Delta 1b$ satisfy a relationship denoted by the following expression: $0.20 \leq (\Delta 1a - \Delta 1b)/\Delta 1a \leq 0.88$, and a refractive index profile $\Delta$ of the core in an entire region of a section of $0 \leq r \leq r1$ as a function $\Delta(r)$ of a distance r from a center of the core in the radial direction is denoted by the following expression: $\Delta(r) = \Delta 1a - (\Delta 1a - \Delta 1b) r/r1$.

14 Claims, 13 Drawing Sheets

(51) Int. Cl.
  *G02B 6/036* (2006.01)
  *G02B 6/02* (2006.01)
  *C03B 37/018* (2006.01)

(52) U.S. Cl.
  CPC ......... *G02B 6/028* (2013.01); *G02B 6/02028* (2013.01); *G02B 6/0365* (2013.01); *G02B 6/03627* (2013.01); *G02B 6/03633* (2013.01); *C03B 2203/22* (2013.01); *C03B 2203/23* (2013.01); *C03B 2203/26* (2013.01)

(56) References Cited

U.S. PATENT DOCUMENTS

| | | | |
|---|---|---|---|
| 6,449,416 B1 * | 9/2002 | Lee | G02B 6/03633 385/126 |
| 6,882,788 B2 * | 4/2005 | Van Bergen | G02B 6/02004 385/123 |
| 6,999,667 B2 * | 2/2006 | Jang | G02B 6/02266 385/123 |
| 7,003,205 B2 * | 2/2006 | Cho | G02B 6/02014 385/123 |
| 7,154,663 B2 * | 12/2006 | Lee | G02B 6/02261 359/334 |
| 7,406,237 B2 | 7/2008 | Bickham et al. | |
| 8,428,411 B2 | 4/2013 | de Montmorillon et al. | |
| 8,588,569 B2 | 11/2013 | Bookbinder et al. | |
| 2003/0063878 A1 * | 4/2003 | Matsuo | C03B 37/01228 385/123 |
| 2006/0045448 A1 | 3/2006 | Nakajima et al. | |
| 2006/0093297 A1 | 5/2006 | Sako et al. | |
| 2007/0147751 A1 | 6/2007 | Fini | |
| 2013/0044987 A1 | 2/2013 | Bickham et al. | |
| 2013/0094824 A1 | 4/2013 | Lee et al. | |
| 2015/0226914 A1 | 8/2015 | Hirano et al. | |

FOREIGN PATENT DOCUMENTS

| | | |
|---|---|---|
| EP | 1 777 559 A1 | 4/2007 |
| EP | 1 808 717 A1 | 7/2007 |
| JP | 63-043107 A | 2/1988 |
| JP | 07-209539 A | 8/1995 |
| JP | 2000-205999 A | 7/2000 |
| JP | 2000264661 A | 9/2000 |
| JP | 2006-133496 A | 5/2006 |
| JP | 2006-293166 A | 10/2006 |
| JP | 2008-547049 A | 12/2008 |
| JP | 4268115 B2 | 5/2009 |
| JP | 2009-543126 A | 12/2009 |
| JP | 2010-501894 A | 1/2010 |
| JP | 4417286 B2 | 2/2010 |
| JP | 2012-516473 A | 7/2012 |
| JP | 2013-512463 A | 4/2013 |
| JP | 2013-088818 A | 5/2013 |
| JP | 2013-520711 A | 6/2013 |
| JP | 2014-067020 A | 4/2014 |
| WO | 2004/092793 A1 | 10/2004 |
| WO | 2005/106544 A1 | 11/2005 |
| WO | 2006/016572 A1 | 2/2006 |
| WO | 2006/049279 A1 | 5/2006 |
| WO | 2006/118362 A1 | 11/2006 |
| WO | 2007/053198 A2 | 5/2007 |
| WO | 2008/005233 A2 | 1/2008 |
| WO | 2008/024255 A2 | 2/2008 |
| WO | 2010/088482 A1 | 8/2010 |
| WO | 2011/066061 A2 | 6/2011 |
| WO | 2011/106293 A1 | 9/2011 |

OTHER PUBLICATIONS

"Characteristics of a single-mode optical fibre and cable", Series G: Transmission Systems and Media, Digital Systems and Networks Transmission media and optical systems characteristics—Optical fibre cables, ITU-T G.652, Nov. 2009.
"Characteristics of a bending-loss insensitive single-mode optical fibre and cable for the access network", Series G: Transmission Systems and Media, Digital Systems and Networks Transmission media and optical systems characteristics—Optical fibre cables, ITU-T G.657, Oct. 2012.
Communication dated Sep. 20, 2016, from the Japanese Patent Office in counterpart application No. 2016-501467.
Communication dated Feb. 28, 2017 issued by the Japanese Patent Office in Corresponding Application No. 2016-509795.
Communication dated Mar. 21, 2017 issued by the European Patent Office in Corresponding Application No. 15826791.4.
Communication dated May 9, 2017, issued from the Japan Patent Office in counterpart Japanese Patent Application No. 2016-501467.
Communication dated May 26, 2017, from the Russian Patent Office in counterpart application No. 2016-109055.

* cited by examiner

ACUTE ANGLE 0%

ACUTE ANGLE 20%

ACUTE ANGLE 30%

α=3

α=4

α=5

OPTICAL FIBER AND MANUFACTURING METHOD THEREOF

CROSS REFERENCE TO RELATED APPLICATIONS

This application is a continuation application based on a PCT Patent Application No. PCT/JP2015/071622, filed Jul. 30, 2015, whose priority is claimed on Japanese Patent Application No. 2014-157571, filed on Aug. 1, 2014, Japanese Patent Application No. 2014-195937, filed on Sep. 26, 2014, and Japanese Patent Application No. 2014-195938, filed on Sep. 26, 2014, the content of which is hereby incorporated by reference.

BACKGROUND OF THE INVENTION

Field of the Invention

The present invention relates to an optical fiber and a manufacturing method thereof, and in particular, relates to an optical fiber having an effective refractive index profile shape in a core for reducing an excessive loss, a so-called bending loss (a macro bend loss) which occurs at the time of bending the optical fiber.

Description of Related Art

An optical fiber has been installed even on the inside of buildings, houses, or the like according to the spread of Fiber To The Home (FTTH). According to this, an optical fiber has attracted attention in which an excessive loss, so-called bending loss (a macro bend loss) which occurs at the time of imparting bending properties, is reduced.

By using an optical fiber having a low bending loss, prevention of instantaneous interruption of a signal due to the loss which occurs at the time of bending the optical fiber, a reduction in installation costs due to handling simplification, and the like have been expected.

ITU-T Recommendation G.657 is used as the standard of an optical fiber in which the bending loss is reduced compared to a standard single mode optical fiber (SSMF) while being based on ITU-T Recommendation G.652 which is the standard of the standard single mode optical fiber (SSMF).

For example, the following methods have been proposed as a method of improving (reducing) the bending loss of the standard single mode optical fiber (SSMF).

(1) Increasing Refractive Index of Core (for example, refer to Patent Document 1 (Japanese Patent No. 4268115)).

The refractive index of the core increases, and a mode field diameter (MFD) decreases compared to SSMF, and thus, containment of light with respect to the core becomes strong, and the bending loss of the optical fiber is reduced. In this case, in order to match dispersion to G.652, it is preferable that so-called depressed refractive index profile in which the refractive index of the clad near the core is reduced be adopted (for example, refer to Non-Patent Document 1 (K. Okamoto and T. Okoshi, "Computer-aided synthesis of the optimum refractive index profile for a multi-mode fiber," IEEE Trans. Microwave Theory Tech., vol. MTT-25, pp. 213-221, 1976)).

A product corresponding to a bending radius up to 15 mm which is based on G.657.A1 is used as such a type of optical fiber.

(2) Disposing Low Refractive Index Portion in Position of Clad Separated from Core (for example, refer to Patent Document 2 (Japanese Unexamined Patent Application, First Publication No. 2013-88818) and Patent Document 3 (U.S. Pat. No. 8,428,411)).

A low refractive index portion, so-called trench, is disposed in a position of the clad disposed on the outer circumference of the core which is separated from the core, and thus, in a case where bending are imparted, the containment of the light with respect to the core becomes strong, and the bending loss of the optical fiber is reduced (for example, refer to Patent Document 4 (Japanese Unexamined Patent Application, First Publication No. S63-43107)).

A product corresponding to a bending radius up to 10 mm which is based on G.657.A2 or G.657.B2 and a product corresponding to a smaller bending radius up to 7.5 mm which is based on G.657.B3 are used as such a type of optical fiber. In addition, a product corresponding to a bending radius up to 7.5 mm which is based on G.657.133 and of which other optical properties are based on the standard of G.657.A series are used as such a type of optical fiber.

(3) Adding Hole to Clad (for example, refer to Patent Document 5 (Japanese Patent No. 4417286) and Patent Document 6 (Japanese Unexamined Patent Application, First Publication No. 2006-293166)).

The containment of the light with respect to the core becomes strong, and the bending loss of the optical fiber is reduced by using so-called hole assisted fiber (HAF) obtained by providing a physical hole passing through the optical fiber in a longitudinal direction in the position of the clad disposed on the outer circumference of the core and the position which is separated from the core, or by using an optical fiber (for example, ClearCurve (Registered Trademark) manufactured by Corning Incorporated) having a fine structure formed of a plurality of independent voids (for example, refer to Patent Document 7 (PCT International Publication No. WO2004/092793) and Patent Document 8 (Published Japanese Translation No. 2009-543126 of the PCT International Publication)).

A product corresponding to a bending radius up to 7.5 mm which is based on G.657.B3 is used as such a type of optical fiber.

(4) Forming Refractive Index Profile Shape of Core to $\alpha$-th Power (for example, refer to Patent Document 3 and Patent Document 9 (U.S. Pat. No. 8,588,569)).

The refractive index profile shape of the core is formed to the $\alpha$-th power (graded index type), and thus, the containment of the light with respect to the core becomes strong, and the bending loss is reduced. For example, in Patent Document 3, it is disclosed that in a case where the refractive index profile shape of the core is formed to the $\alpha$-th power, the bending loss is reduced by 30% compared to a simple step type refractive index profile shape.

Each of the related arts has the following problems.

(1) Increasing Refractive Index of Core.

In the optical fiber having MFD smaller than that of SSMF, a connection step occurs at the time of being connected to SSMF. FIG. 1 shows a schematic view of an OTDR defective waveform observed in a case where the connection step occurs.

The OTDR defective waveform having a shape as shown in FIG. 1 is originally observed when breaking occurs (for example, refer to FIG. 5(a) of Japanese Unexamined Patent Application, First Publication No. 2000-205999), and also occurs in a position connected to an optical fiber having different MFD. This is because signal intensity of OTDR is proportionate to the minus square of MFD (inversely proportionate to the 2nd power of MFD). For example, when OTDR is measured from the side of the optical fiber having small MFD in a transmission path where an optical fiber having small MFD is connected to an optical fiber having large MFD, the waveform as shown in FIG. 1 is obtained even though breaking does not occur.

In addition, in the optical fiber in which the refractive index of the core increases, it is possible to reduce the bending loss. However, according to this, the mode field diameter decreases, and a connection loss with respect to SSMF increases. For this reason, there is a limit for reducing the bending loss.

(2) Disposing Low Refractive Index Portion in Position of Clad Separated from Core.

A Vapor-phase axial deposition (VAD) method, an Outside vapor deposition (OVD) method, a Chemical vapor deposition (CVD), and the like have been known as a preparation method of an optical fiber preform. In order to form the low refractive index portion by a method (so-called outside vapor-deposition method) of depositing a material on an outer surface of a starting member, such as a vapor-phase axial deposition method or an outside vapor deposition method, it is necessary to form a plurality of layers having a different refractive index, and thus, the number of steps necessary for manufacturing the preform increases. On the other hand, in order to form the low refractive index portion by a method (so-called inside vapor-deposition method) of depositing a material on an inner surface of a silica tube (a starting silica tube) as a starting member, such as a chemical vapor deposition method, it is necessary to form not only the core but also the trench on the inner side of the starting silica tube, and thus, the size of a preform which is able to be manufactured from the starting silica tube having the same size (of an inner diameter) becomes small. In addition, in both of the outside vapor-deposition method and the inside vapor-deposition method, a dopant for decreasing a refractive index to be less than that of silica is necessary in order to provide the low refractive index portion.

In addition, in an optical fiber having a trench type refractive index profile, it is necessary to form the plurality of layers having a different refractive index, and thus, a manufacturing step of a preform becomes complicated.

(3) Adding Hole to Clad.

A step of forming a hole in the clad is necessary in a stage of the optical fiber preform, and thus, the number of steps necessary for manufacturing the preform increases. In an optical fiber having a hole, a manufacturing step becomes complicated compared to an optical fiber having a solid structure. In addition, in order to retain the hole in a step of drawing the optical fiber from the optical fiber preform, a special drawing step is necessary. In the optical fiber having a hole, an advanced drawing technology is required, and thus, the manufacturing is not easily performed.

(4) Forming Refractive Index Profile Shape of Core to α-th Power.

In order to form the refractive index profile shape of the core to the α-th power, controllability of a refractive index profile is necessary. That is, in order to change the refractive index of a core material, it is necessary that the amount of dopant be highly controlled.

SUMMARY OF THE INVENTION

The present invention has been made in consideration of the circumstances described above, and an object of the present invention is to provide an optical fiber which is able to have MFD approximately identical to that of SSMF and is able to reduce a bending loss without adding a trench or a hole.

In addition, it has been known that the refractive index of the clad in a portion close to the core considerably affects optical properties of the optical fiber, but as a result of intensive studies of the present inventors, a refractive index profile which is able to reduce a bending loss without decreasing a mode field diameter has been found.

Another object of the present invention is to make suppression of a connection loss at the time of connecting an optical fiber to another optical fiber and a reduction in a bending loss compatible by adopting the refractive index profile on the basis of the finding.

In order to attain the objects described above, an optical fiber according to a first aspect of the present invention includes a core, and a clad surrounding an outer circumference of the core, when a radius of the core is r1, the relative refractive index difference between the center of the core and the clad is a first relative refractive index difference $\Delta 1a$, and a relative refractive index difference between a position in which a distance from the center of the core in a radial direction is r1 and the clad is a second relative refractive index difference $\Delta 1b$, the first relative refractive index difference $\Delta 1a$ is greater than 0, the second relative refractive index difference $\Delta 1b$ is greater than 0, the first relative refractive index difference $\Delta 1a$ is greater than the second relative refractive index difference $\Delta 1b$, the first relative refractive index difference $\Delta 1a$ and the second relative refractive index difference $\Delta 1b$ satisfy a relationship denoted by the following expression: $0.20 \leq (\Delta 1a - \Delta 1b)/\Delta 1a \leq 0.88$, and a refractive index profile $\Delta$ of the core in the entire region of a section of $0 \leq r \leq r1$ as a function $\Delta(r)$ of a distance r from the center of the core in the radial direction is denoted by the following expression: $\Delta(r) = \Delta 1a - (\Delta 1a - \Delta 1b)r/r1$.

The first relative refractive index difference $\Delta 1a$ may satisfy a relationship of $0.35\% < \Delta 1a \leq 0.50\%$.

The second relative refractive index difference $\Delta 1b$ may satisfy a relationship of $0.06\% \leq \Delta 1b < 0.35\%$.

The radius r1 may satisfy a relationship of $4.50 \ \mu m < r1 \leq 6.25 \ \mu m$.

A value of a bending loss at a wavelength of 1550 nm and a bending radius of 15 mm may be less than or equal to 0.102 dB/10 turns.

The first relative refractive index difference $\Delta 1a$ and the second relative refractive index difference $\Delta 1b$ may satisfy a relationship denoted by the following expression: $0.42 \leq (\Delta 1a - \Delta 1b)/\Delta 1a \leq 0.88$.

A value of a bending loss at a wavelength of 1550 nm and a bending radius of 15 mm may be less than or equal to 0.055 dB/10 turns.

A cable cut-off wavelength may be less than or equal to 1260 nm.

A mode field diameter MFD at a wavelength of 1310 nm may be in a range of $8.2 \ \mu m \leq MFD \leq 9.9 \ \mu m$.

In addition, a manufacturing method of an optical fiber according to a second aspect of the present invention is a manufacturing method of the optical fiber according to the first aspect described above, in which glass configuring the core, or a part of glass configuring the core and glass configuring the clad, is prepared by an outside vapor deposition method or a chemical vapor deposition method at the time of preparing a preform of the optical fiber.

An optical fiber according to a third aspect of the present invention includes a core, and a clad formed on an outer circumference of the core, the clad includes an inner cladding layer adjacent to the core and an outer cladding layer formed on an outer circumference of the inner cladding layer, the core has a refractive index of Δ1 and a maximum refractive index of Δ1max, the inner cladding layer has a refractive index of Δ2 and a minimum refractive index of Δ2min, the outer cladding layer has a refractive index of Δ3, and the refractive indices of the core, the inner cladding layer, and the outer cladding layer are in relationships denoted by Expression [4] and Expression [5]. Δ1max>Δ2min and Δ1max>Δ3 . . . [4] and 0.01%<|Δ2min−Δ3|<0.03% . . . [5]. An outer circumference radius r1 of the core, an outer circumferential radius r2 of the inner cladding layer, and an outer circumferential radius r3 of the outer cladding layer are in relationships denoted by Expression [6] and Expression [7]. r1<r2<r3 . . . [6], and 0.2≤r1/r2≤0.5 . . . [7].

A cut-off wavelength $\lambda c_{22m}$ of 22 m satisfies Expression [8]. $\lambda c_{22m}$≤1260 nm . . . [8]. A mode field diameter at a wavelength of 1310 nm satisfies Expression [9]. 8.6 μm≤Mode Field Diameter≤9.5 μm . . . [9].

The refractive indices of the core, the inner cladding layer, and the outer cladding layer may be in relationships denoted by Expression [1A] and Expression [2A]. Δ1max>Δ3>Δ2min . . . [1A], and 0.01%<(Δ3−Δ2min)<0.03% . . . [2A].

In the fiber according to the third aspect, a loss increase at a wavelength of 1550 nm at the time of winding the fiber around a mandrel having a diameter of 15 mm 10 times may be less than or equal to 0.25 dB, and a loss increase at a wavelength of 1625 nm at the time of winding the fiber around the mandrel 10 times may be less than or equal to 1.0 dB.

The outer cladding layer may be formed of pure silica glass, and the inner cladding layer may be formed of silica glass to which fluorine is added.

The outer cladding layer may be formed of pure silica glass, and the inner cladding layer may be formed of silica glass to which chlorine is added.

In a case of Δ2<Δ3, for example, the inner cladding layer may be formed of silica glass to which fluorine (F) is added, and in a case of Δ2>Δ3, for example, the inner cladding layer may be formed of silica glass to which chlorine (Cl) is added.

An optical fiber according to a fourth aspect of the present invention includes a core, and a clad formed on an outer circumference of the core, the clad includes an inner cladding layer adjacent to the core, a trench adjacent to an outer circumference of the inner cladding layer, and an outer cladding layer formed on an outer circumference of the trench, the core has a refractive index of Δ1 and a maximum refractive index of Δ1max, the inner cladding layer has a refractive index of Δ2 and a minimum refractive index of Δ2min, the trench has a refractive index of Δ3 and a minimum refractive index of Δ3min, the outer cladding layer has a refractive index of Δ4, and the refractive indices of the core, the inner cladding layer, the trench, and the outer cladding layer are in relationships denoted by Expression [14] to Expression [16]. Δ1 max>Δ2>Δ3min . . . [14], Δ1max>Δ4>Δ3min . . . [15], and 0.01%<(Δ4−Δ3min)<0.03% . . . [16]. An outer circumference radius r1 of the core, an outer circumferential radius r2 of the inner cladding layer, an outer circumferential radius r3 of the trench, and an outer circumferential radius r4 of the outer cladding layer are in relationships denoted by Expression [17] to Expression [19]. r1≤r2<r3<r4 . . . [17], 1≤r2/r1≤5 . . . [18], and 1<r3/r2≤2 . . . [19]. A cut-off wavelength $\lambda c_{22m}$ of 22 m satisfies Expression [a]. $\lambda c_{22m}$≤1260 nm . . . [20]. A mode field diameter at a wavelength of 1310 nm satisfies Expression [21]. 8.6 μm≤Mode Field Diameter≤9.5 μm . . . [21].

In the optical fiber according to the fourth aspect, a loss increase at a wavelength of 1550 nm at the time of winding the optical fiber around a mandrel having a diameter of 15 mm 10 times may be less than or equal to 0.25 dB, and a loss increase at a wavelength of 1625 nm at the time of winding the optical fiber around the mandrel 10 times may be less than or equal to 1.0 dB.

The outer cladding layer may be formed of pure silica glass, and the trench may be formed of silica glass to which fluorine is added.

According to the first aspect and the second aspect of the present invention, it is possible to provide an optical fiber in which the refractive index profile of the core is linear and simple compared to an α-th power distribution, and the bending loss is able to be reduced. According to the optical fiber according to the first aspect and the second aspect, the optical fiber is able to have MFD approximately identical to that of SSMF, and thus, even when the optical fiber is connected to SSMF, a connection step does not become a problem. In addition, it is not necessary to form a trench or a hole in the clad.

According to the third aspect of the present invention, a difference between the refractive indices of the inner cladding layer and the outer cladding layer, the ratio of the outer circumferential radii of the core and the inner cladding layer, and the like are adjusted, and thus, a connection loss is able to be suppressed to be low at the time of being connected to another optical fiber (for example, a general single mode optical fiber (SSMF)), and the bending loss is able to be reduced.

In the third aspect of the present invention, it is possible to use a manufacturing method of the related art without considerably changing the method, and thus, the manufacturing is easy, and it is possible to keep manufacturing costs low.

According to the fourth aspect of the present invention, a difference between the refractive indices of the trench and the outer cladding layer, the ratio of the outer circumferential radii of the core, the inner cladding layer, the trench, and the like are adjusted, and thus, a connection loss is able to be suppressed to be low at the time of being connected to another optical fiber (for example, a general single mode optical fiber (SSMF)), and the bending loss is able to be reduced.

In the fourth aspect of the present invention, it is possible to use a manufacturing method of the related art without considerably changing the method, and thus, the manufacturing is easy, and it is possible to keep the manufacturing costs low.

DETAILED DESCRIPTION OF THE INVENTION

Hereinafter, the present invention will be described on the basis of preferred embodiments.

Figure 1:
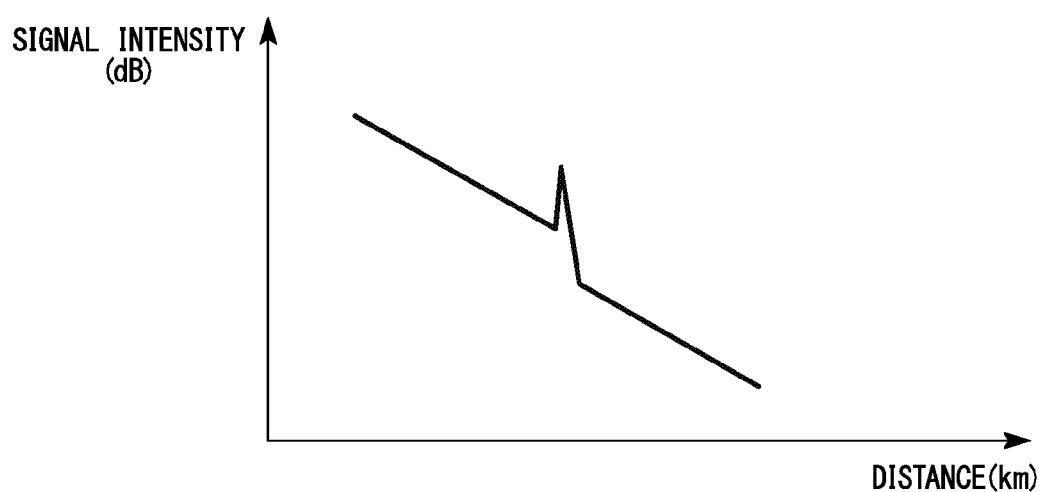
FIG. 1 is a schematic view of an OTDR waveform observed at the time of connecting optical fibers having different MFD.
Figure 2:
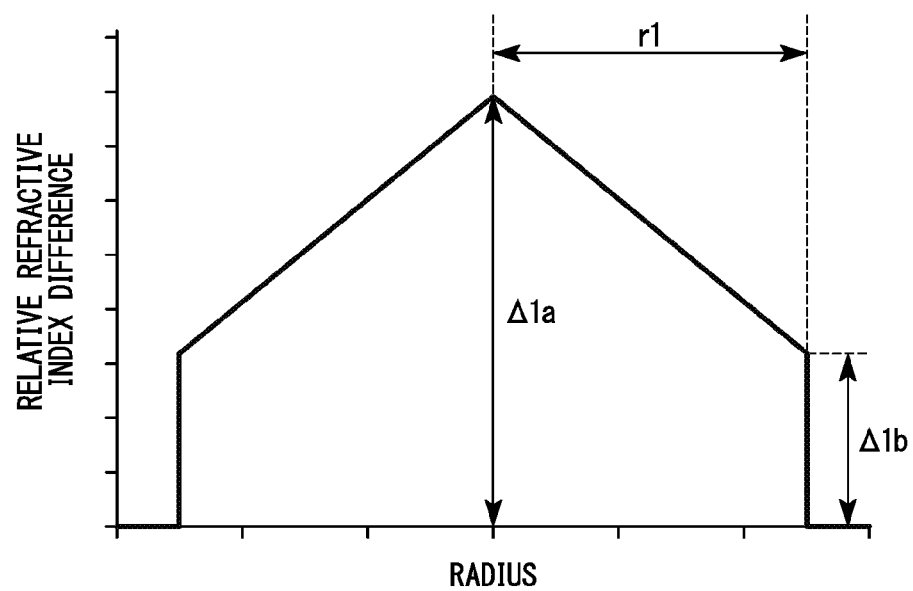
FIG. 2 is a schematic view of a refractive index profile of an optical fiber according to a first embodiment of the present invention.

FIG. 2 shows a schematic view of a refractive index profile of an optical fiber according to a first embodiment of the present invention. The optical fiber according to this embodiment includes a core disposed in the center portion of the optical fiber, and a clad surrounding the outer circumference of the core. In general, the clad is concentric with respect to the core, but the clad and the core are able to be eccentric within an acceptable range.

In FIG. 2, r1 indicates the radius of the core. A left end of the range of r1 indicates a center position of the core, and a right end of the range of r1 indicates an outer circumference position of the core. $\Delta 1a$ (a first relative refractive index difference) indicates a relative refractive index difference in the center of the core, and $\Delta 1b$ (a second relative refractive index difference) indicates a relative refractive index difference in the outer circumference of the core. A relative refractive index difference of $\Delta 1a$ and $\Delta 1b$ indicates a relative refractive index difference based on the refractive index of the clad. A range in which a distance from the center of the core is less than or equal to r1 indicates the core, the outside of the range of r1 (in FIG. 2, a position in which the distance from the center of the core is greater than r1) indicates the clad. In the clad, the relative refractive index difference is 0.

A refractive index profile $\Delta$ of the core of the optical fiber according to this embodiment is denoted by Expression [1] described below in the entire region of a section of $0 \leq r \leq r1$ as a function $\Delta(r)$ of a distance r from the center of the core in a radial direction.

$$\Delta(r) = \Delta 1a - \frac{\Delta 1a - \Delta 1b}{r1} r \quad [1]$$

Here, in Expression [1], the relative refractive index difference (the first relative refractive index difference) $\Delta 1a$ is greater than the relative refractive index difference (the second relative refractive index difference) $\Delta 1b$. That is, the refractive index in the center of the core is greater than the refractive index in the outer circumference of the core. In addition, in general, in the optical fiber which guides light according to a difference between the refractive indices of the core and the clad, it is necessary that the relative refractive index difference $\Delta 1a$ be greater than 0. This indicates that the refractive index in the center of the core is greater than the refractive index in the clad.

Herein, a parameter such as an "acute angle" is introduced. The "acute angle" of the optical fiber according to this embodiment is represented by a symbol A, and is defined as Expression [2] described below.

$$A = \frac{\Delta 1a - \Delta 1b}{\Delta 1a} \quad [2]$$

Figure 3:
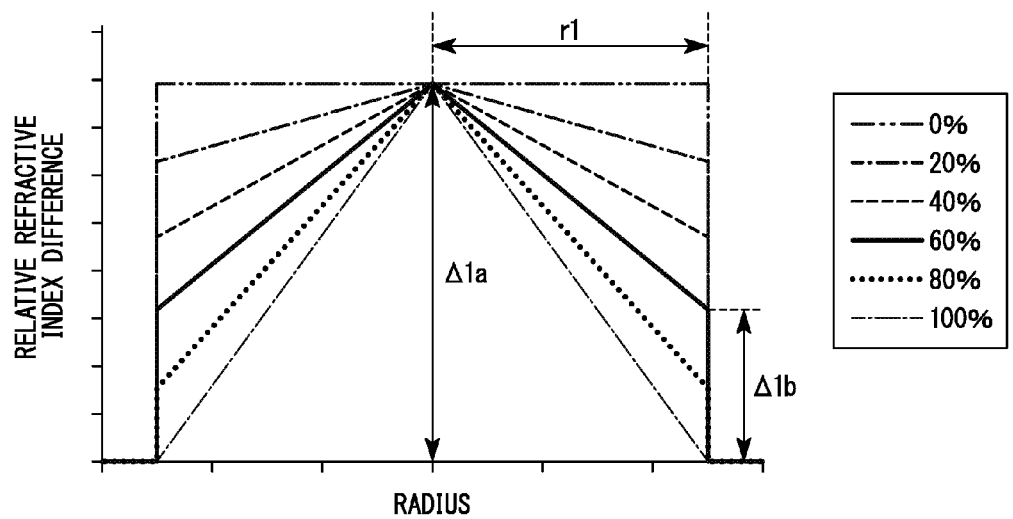
FIG. 3 is a schematic view of a refractive index profile in a case of changing an acute angle.

FIG. 3 shows a refractive index profile in a case of changing the acute angle of the optical fiber according to this embodiment in units of 20% from 0% to 100%. In a case where $\Delta 1a$ is identical to $\Delta 1b$, an acute angle A is 0%, and the refractive index profile returns to a step type refractive index profile. In addition, in a case where $\Delta 1b$ is identical to 0, the acute angle A is 100%. In a case where the acute angle is 0%, the refractive index profile has a "quadrangle shape", and in a case where the acute angle is 100%, the refractive index profile has a "triangular shape". In contrast, in a refractive index profile having a "pentagonal shape" exemplified in FIG. 2, the refractive index profile not only is denoted by Expression [1], but also satisfies a relationship of $\Delta 1a > \Delta 1b > 0$. In this case, the acute angle is greater than 0% and less than 100%.

Next, an α-th power distribution will be described in order to be compared to the refractive index profile having a "pentagonal shape". In general, a refractive index profile of an α-th power distribution of the optical fiber according to this embodiment is denoted by Expression [3] described below.

$$n(r) = \begin{cases} n_1[1-2\Delta(r/a)^\alpha]^{1/2} & (0 \le r \le a) \\ n_0 & (r \ge a) \end{cases} \quad [3]$$

In Expression [3], $n_1$ represents the refractive index in the center of the core, $n_0$ represents the refractive index of the clad, $\Delta$ represents the relative refractive index difference in the center of the core based on the clad, r represents the distance from the center of the core in the radial direction, and a represents the radius of the core. The relative refractive index difference $\Delta$ is defined by $\Delta=(n_1^2-n_0^2)/2n_1^2$. For this reason, $n_0$, $n_1$, and $\Delta$ have a relationship of $n_0=n_1(1-2\Delta)^{1/2}$.

Figure 4:
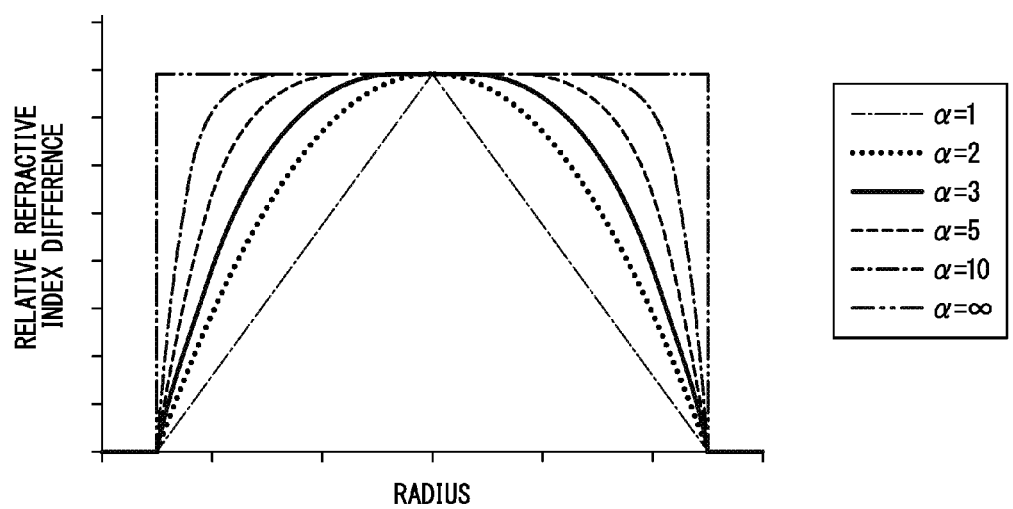
FIG. 4 is a schematic view of a refractive index profile in a case of changing an α value.

In addition, FIG. 4 shows a refractive index profile in a case of changing an α value from 1 to ∞ in the α-th power distribution. A case where α is 1 corresponds to a case where the acute angle is 100% in Expression [1], and a case where α is ∞ corresponds to a case where the acute angle is 0% in Expression [1].

The effect of the optical fiber according to this embodiment will be described. Light is not able to be guided through the core of the optical fiber due to a change in the refractive index profile which is induced at the time of bending the optical fiber, the light is radiated to the clad, and thus, a bending loss of the optical fiber occurs. In order to reduce the bending loss, it is important to suppress a light leakage with respect to the clad. For this reason, it is considered that it is effective for concentrating a distribution of the light guided through the optical fiber on the center portion of the core in advance and to suppress the light leakage with respect to the clad.

In order to concentrate the distribution of the light on the center portion of the core, (a) a refractive index profile is preferable in which the refractive index gradually decreases from the center portion of the core to the clad. However, when the relative refractive index difference between the core and the clad is small, the light leakage easily occurs in the clad. Therefore, in order to suppress the light leakage with respect to the clad, it is preferable that (b) a relative refractive index difference of an outer circumference portion of the core based on the clad increase. In order to reduce the bending loss, it is preferable to have two characteristics of (a) and (b) in combination. It is considered that the refractive index profile having a pentagonal shape has two characteristics of (a) and (b) in combination, and thus, is effective for reducing the bending loss.

In order to obtain the effect of reducing the bending loss, it is more preferable to have the following characteristics.

The range of the acute angle A defined by Expression [2] described above is preferably $0.20 \le A \le 0.88$, and is more preferably $0.42 \le A \le 0.88$.

It is preferable that the range of the relative refractive index difference $\Delta 1a$ of the core center be $0.35\% < \Delta 1a \; 0.50\%$.

It is preferable that the range of the relative refractive index difference $\Delta 1b$ of the core outer circumference be $0.06\% \; \Delta 1b < 0.35\%$.

It is preferable that the range of the core radius r1 be $4.50 \; \mu m < r1 \le 6.25 \; \mu m$.

The range of the bending loss at a wavelength of 1550 nm and a bending radius of 15 mm is preferably less than or equal to 0.102 dB/10 turns (less than or equal to 0.102 dB per 10 turns), and is more preferably less than or equal to 0.055 dB/10 turns (less than or equal to 0.055 dB per 10 turns).

It is preferable that the range of the cable cut-off wavelength be less than or equal to 1260 nm.

It is preferable that the range of the mode field diameter MFD at a wavelength of 1310 nm be $8.2 \; \mu m \le MFD \le 9.9 \; \mu m$.

The optical fiber according to this embodiment is able to be manufactured by preparing an optical fiber preform by a known preform preparation method such as a vapor-phase axial deposition method, an outside vapor deposition method, and a chemical vapor deposition method, and then, by drawing a optical fiber from the optical fiber preform. Examples of the preparation method of the optical fiber preform include a method in which glass configuring at least the core is prepared by an outside vapor deposition method or a chemical vapor deposition method, and a remaining glass portion is further prepared by deposition of silica ($SiO_2$) glass, a jacket of a silica tube, and the like. At this time, the portion prepared by the outside vapor deposition method or the chemical vapor deposition method may be only (a part or all of) the glass configuring the core, or may include a part of glass configuring the clad in addition to the glass configuring the core. The size of the optical fiber is not particularly limited, and examples of the diameter of the clad include 125 μm, 80 μm, and the like. In the optical fiber after the drawing, one or two or more layers of coating materials such as a resin may be laminated on the outer circumference of the clad.

As described above, the first embodiment of the present invention has been described, but the first embodiment is an example of the present invention, and addition, omission, substitution, and other changes are able to be performed without departing from the range of the present invention.

Examples of a dopant used for manufacturing a silica-based optical fiber include germanium (Ge), phosphorus (P), fluorine (F), boron (B), aluminum (Al), and the like. Two or more types of dopants may be used for manufacturing the silica-based optical fiber. In an example of the composition of the core and the clad, a core material includes Ge added silica, and a clad material includes pure silica.

The expression of the refractive index profile denoted by Expression [1] indicates a distribution on design. When an actual optical fiber is prepared, it is assumed that a fluctuation (a manufacturing error) in the refractive index profile due to manufacturing factors occurs. The optical fiber according to the first embodiment may satisfy the characteristics such as Expression [1] within a range of an acceptable error on manufacturing. In a case where a fluctuation in the refractive index profile of the outer circumference portion of the core is large, the optical fiber according to the first embodiment may satisfy the characteristics such as Expression [1] or the like, for example, within a range where the distance from the center of the core is less than or equal to 90% (or less than or equal to 95% or the like) of the radius of the core. In a case where the outer circumference portion of the core is excluded from a calculation range of Expression [1], the relative refractive index difference $\Delta 1b$ may not be the relative refractive index difference of the outer circumference of the actual core, but may be a virtual value for describing the refractive index profile on the inside of the core from the outer circumference.

Hereinafter, a second embodiment and a third embodiment of the present invention will be described with reference to the drawings.

Figure 9:
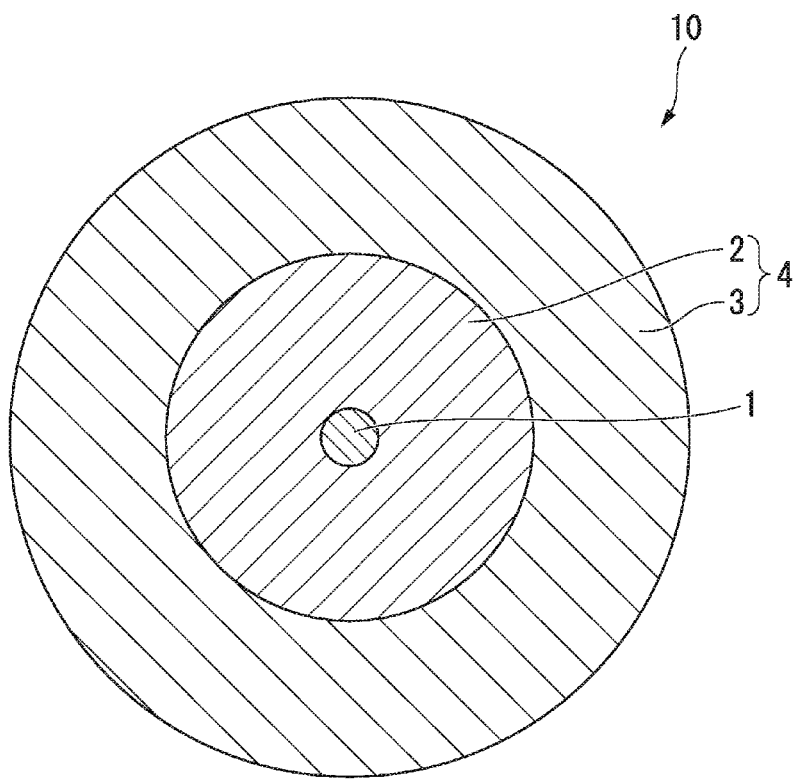
FIG. 9 is a sectional view schematically showing an optical fiber according to a second embodiment.

FIG. 9 shows schematic configuration of an optical fiber 10 according to a second embodiment of the present invention.

The optical fiber 10 includes a core 1 disposed on the center portion, and a clad 4 disposed on the outer circumference side (the outer circumference) of the core 1 to be concentric with the core 1.

The clad 4 includes an inner cladding layer 2 adjacent to the outer circumference side (the outer circumference) of the core 1, and an outer cladding layer 3 formed on the outer circumference side (the outer circumference) of the inner cladding layer 2.

Figure 10:
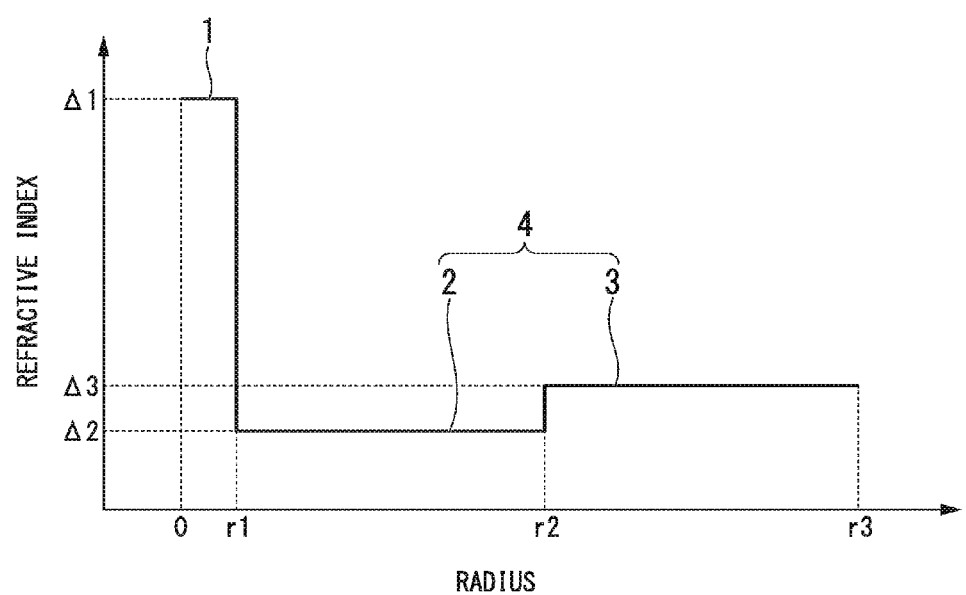
FIG. 10 is a diagram schematically showing a refractive index profile of the optical fiber shown in FIG. 9.

FIG. 10 schematically shows a refractive index profile of the optical fiber 10.

The refractive index of the core 1 is defined as $\Delta 1$, and the maximum refractive index of the core 1 is defined as $\Delta 1max$.

The refractive index of the inner cladding layer 2 is defined as $\Delta 2$, and the minimum refractive index of the inner cladding layer 2 is defined as $\Delta 2min$.

The refractive index of the outer cladding layer 3 is defined as $\Delta 3$.

The maximum refractive index $\Delta 1max$ of the core 1 is the refractive index of the core 1 which is maximized in a diameter direction range from the center of the core 1 to the outer circumference of the core 1. In the refractive index profile shown in FIG. 10, the refractive index $\Delta 1$ of the core 1 is constant without depending on the position in the diameter direction, and thus, the refractive index $\Delta 1$ is identical to the maximum refractive index $\Delta 1max$ in the entire range.

The minimum refractive index $\Delta 2min$ of the inner cladding layer 2 is the refractive index of the inner cladding layer 2 which is minimized in a diameter direction range from the inner circumference of the inner cladding layer 2 to the outer circumference of the inner cladding layer 2. In the refractive index profile shown in FIG. 10, the refractive index $\Delta 2$ of the inner cladding layer 2 is constant without depending on the position in the diameter direction, and thus, the refractive index $\Delta 2$ is identical to the minimum refractive index $\Delta 2min$ in the entire range.

In the optical fiber 10, Expression [4] described below is established.

$$\Delta 1max > \Delta 2min \text{ and } \Delta 1max > \Delta 3 \quad [4]$$

As shown in Expression [4], the maximum refractive index $\Delta 1max$ of the core 1 is greater than the minimum refractive index $\Delta 2min$ of the inner cladding layer 2 and the refractive index $\Delta 3$ of the outer cladding layer 3.

In addition, in the optical fiber 10, the minimum refractive index $\Delta 2min$ of the inner cladding layer 2 is less than the refractive index $\Delta 3$ of the outer cladding layer 3.

In the optical fiber 10, Expression [5] described below is further established.

$$0.01\% < |\Delta 2min - \Delta 3| < 0.03\% \quad [5]$$

Expression [5] indicates that the absolute value of a difference between the minimum refractive index $\Delta 2min$ of the inner cladding layer 2 and the refractive index $\Delta 3$ of the outer cladding layer 3 is greater than 0.01% and less than 0.03%.

When the absolute value of the difference between $\Delta 2min$ and $\Delta 3$ is excessively small, the bending loss may not be sufficiently reduced. In contrast, when the absolute value of the difference between $\Delta 2min$ and $\Delta 3$ is excessively large, the mode field diameter decreases, and a connection loss at the time of being connected to the other optical fiber (for example, a general single mode optical fiber (SSMF)) may increase.

In the optical fiber 10, it is possible to reduce the bending loss by setting the absolute value of the difference between $\Delta 2min$ and $\Delta 3$ to be greater than 0.01%. In addition, it is possible to optimize the mode field diameter (MFD) and to suppress the connection loss to be low at the time of being connected to the other optical fiber by setting the absolute value of the difference between $\Delta 2min$ and $\Delta 3$ to be less than 0.03%.

In the optical fiber 10 of the second embodiment, Expression [1A] described below is established with respect to a magnitude relationship of $\Delta 1max$, $\Delta 2min$, and $\Delta 3$.

$$\Delta 1max > \Delta 3 > \Delta 2min \quad [1A]$$

As shown in Expression [1A], the maximum refractive index $\Delta 1max$ of the core 1 is greater than the refractive index $\Delta 3$ of the outer cladding layer 3.

The refractive index $\Delta 3$ of the outer cladding layer 3 is greater than the minimum refractive index $\Delta 2min$ of the inner cladding layer 2.

$\Delta 3$ is greater than $\Delta 2min$, and thus, Expression [5] described above is able to be described as follows.

$$0.01\% < (\Delta 3 - \Delta 2min) < 0.03\% \quad [2A]$$

Expression [2A] indicates that a difference between the refractive index $\Delta 3$ of the outer cladding layer 3 and the minimum refractive index $\Delta 2min$ of the inner cladding layer 2 is greater than 0.01% and less than 0.03%.

The outer circumferential radii of the core 1, the inner cladding layer 2, and the outer cladding layer 3 are respectively defined as r1, r2, and r3.

The outer circumference radius r1 of the core 1, the outer circumferential radius r2 of the inner cladding layer 2, and the outer circumferential radius r3 of the outer cladding layer 3 have a relationship denoted by Expression [6] described below.

$$r1 < r2 < r3 \quad [6]$$

A ratio r1/r2 of the outer circumference radius r1 of the core 1 to the outer circumferential radius r2 of the inner cladding layer 2 is in a range denoted by Expression [7] described below.

$$0.2 \leq r1/r2 \leq 0.5 \quad [7]$$

When r1/r2 is excessively small, the mode field diameter decreases, the connection loss at the time of being connected to the other optical fiber (for example, SSMF) may increase. In contrast, when r1/r2 is excessively large, the bending loss may increase.

In the optical fiber 10, r1/r2 is adjusted to be greater than or equal to 0.2, and thus, the mode field diameter is able to be optimized, and the connection loss at the time of being connected to the other optical fiber is able to be suppressed to be low. r1/r2 is adjusted to be less than or equal to 0.5, and thus, the bending loss is able to be reduced.

In the optical fiber 10, a cut-off wavelength $\lambda c_{22m}$ of 22 m is adjusted to be less than or equal to 1260 nm.

That is, Expression [8] described below is established.

$$\lambda_{22m} \leq 1260 \text{ nm} \quad [8]$$

Accordingly, the regulation of ITU-T Recommendation G.652 is able to be satisfied.

The cut-off wavelength $\lambda_{22m}$, for example, is able to be measured by a measurement method disclosed in ITU-T Recommendation G.650.

In the optical fiber 10, the refractive index and the outer circumferential radius described above are adjusted, and thus, the mode field diameter (MFD) at a wavelength of 1310 nm is greater than or equal to 8.6 µm and less than or equal to 9.5 µm. That is, Expression [9] described below is established.

$$8.6\ \mu m \leq MFD \leq 9.5\ \mu m \quad [9]$$

The mode field diameter is in the range of Expression [9], and thus, the connection loss at the time of being connected to the other optical fiber (for example, SSMF) is able to be suppressed to be low.

In the optical fiber 10, the mode field diameter is in the range of Expression [9], and thus, the regulation of ITU-T G.652 is satisfied.

In the optical fiber 10, it is preferable that a loss increase at a wavelength of 1550 nm at the time of winding the optical fiber 10 around a cylindrical mandrel having a diameter of 15 mm 10 times be less than or equal to 0.25 dB.

In addition, it is preferable that the loss increase at a wavelength of 1625 nm at the time of winding the optical fiber 10 around the cylindrical mandrel having a diameter of 15 mm 10 times be less than or equal to 1.0 dB.

The core 1, for example, is able to be configured of silica glass of which the refractive index increases by adding a dopant such as germanium (Ge).

The inner cladding layer 2, for example, is able to be configured of silica glass of which the refractive index decreases by adding a dopant such as fluorine (F). The inner cladding layer 2, for example, may be configured of silica glass of which the refractive index increases by adding a dopant such as chlorine (Cl).

The outer cladding layer 3, for example, is able to be configured of pure silica glass. In the outer cladding layer 3, the refractive index may be adjusted by adding a dopant (for example, Ge, F, and the like).

Each layer configuring the optical fiber 10 is able to be formed by a known method such as a modified chemical vapor deposition method, a plasma chemical vapor deposition method, a vapor-phase axial deposition method, and an outside vapor deposition method, or a combination thereof For example, in a case where the modified chemical vapor deposition method is adopted, the optical fiber preform is able to be prepared as follows.

A glass deposition layer which becomes the inner cladding layer 2 is formed on the inside of a silica glass tube (for example, a glass tube formed of pure silica glass) which becomes the outer cladding layer 3, for example, by using a raw material containing a dopant such as fluorine (F). The refractive index of the inner cladding layer 2 is able to be adjusted by the added amount of the dopant.

Next, a glass deposition layer which becomes the core 1 is formed on the inside of the glass deposition layer, for example, by using a raw material containing a dopant such as germanium (Ge). Furthermore, the core 1 is able to be formed by using a core rod which is separately prepared.

The silica glass tube in which the glass deposition layer is formed becomes the optical fiber preform through a transparency step, a solidification step, and the like. The optical fiber preform is subjected to fiber drawing, and thus, the optical fiber 10 shown in FIG. 9 is able to be obtained.

The chemical vapor deposition method is preferable from the viewpoint of accurately adjusting the refractive index profile by adding a dopant.

The vapor-phase axial deposition method and the outside vapor deposition method are also able to be applied to manufacture the optical fiber 10. The vapor-phase axial deposition method and the outside vapor deposition method have advantages such as high productivity.

In the optical fiber 10, a difference in the refractive indices between the inner cladding layer 2 and the outer cladding layer 3 is in the range described above (refer to Expression [5]), and a ratio of the outer circumferential radius of the core 1 and the outer circumferential radius of the inner cladding layer 2 in the range described above (refer to Expression [7]), and thus, the connection loss at the time of being connected to the other optical fiber is able to be suppressed to be low, and the bending loss is able to be reduced.

It has been known that the refractive index of the clad in a portion close to the core considerably affects optical properties of the optical fiber, but as a result of intensive studies of the present inventor, a refractive index profile has been found in which the bending loss is able to be reduced without decreasing the mode field diameter.

By adopting the refractive index profile, the optical fiber 10 has technical meaning from the viewpoint of making suppression of the connection loss at the time of being connected to the other optical fiber and a reduction in the bending loss compatible.

In the optical fiber 10, the difference in the refractive indices between the inner cladding layer 2 and the outer cladding layer 3 is small, and thus, the refractive index of the inner cladding layer 2 and the outer cladding layer 3 is able to be easily and accurately adjusted by using the manufacturing method of the related art (for example, a general manufacturing method of SSMF) without considerably changing the method.

In addition, the difference in the refractive indices between the inner cladding layer 2 and the outer cladding layer 3 is small, and thus, constraint based on the manufacturing method decreases. For example, not only the chemical vapor deposition method which is considered to be suitable for adjusting the refractive index profile but also the vapor-phase axial deposition method and the outside vapor deposition method are able to be adopted.

Accordingly, the optical fiber 10 is able to be easily manufactured, and manufacturing costs are able to be made low.

In the optical fiber 10, the difference in the refractive indices between the inner cladding layer 2 and the outer cladding layer 3 is small, and thus, the added amount of the dopant such as fluorine (F) and chlorine (Cl) for forming the inner cladding layer 2 is able to be reduced.

Raw material gas (for example, $SiF_4$) used in a dope such as fluorine (F) is expensive, and thus, raw material costs are able to be suppressed and manufacturing costs are able to be made low by reducing the amount of the dopant added.

As shown in FIG. 10, in the optical fiber 10, the minimum refractive index $\Delta 2min$ of the inner cladding layer 2 is less than the refractive index $\Delta 3$ of the outer cladding layer 3, and thus, it is possible to make containment of the light with respect to the core 1 excellent and to reduce the bending loss.

Figure 11:
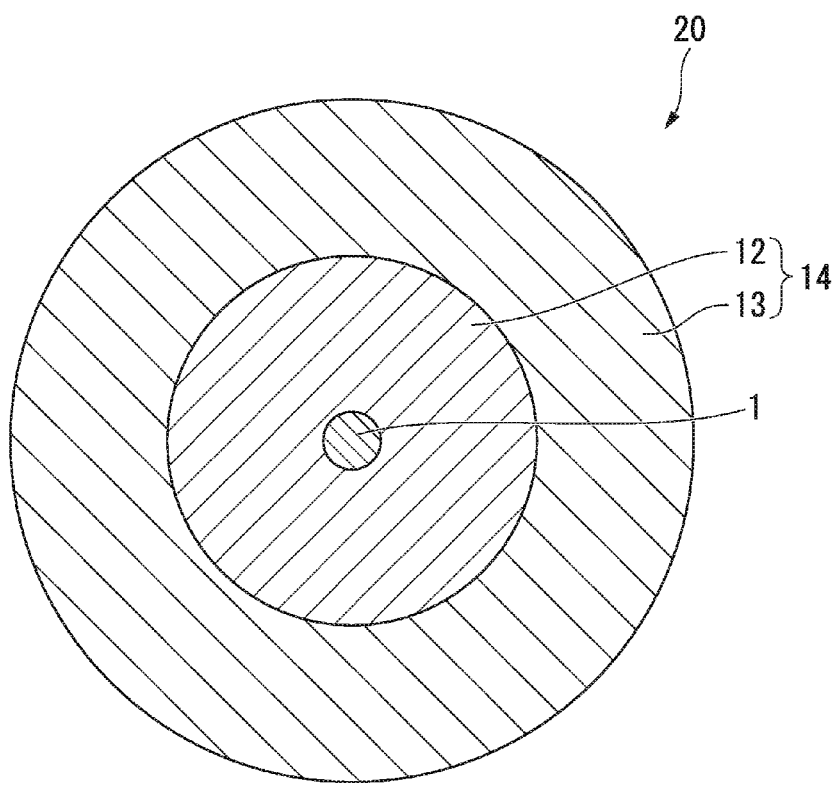
FIG. 11 is a sectional view schematically showing an optical fiber according to a third embodiment.

FIG. 11 shows a schematic configuration of an optical fiber 20 according to a third embodiment of the present invention.

The optical fiber 20 includes the core 1 disposed on the center portion, and a clad 14 disposed on the outer circumference side (the outer circumference) of the core 1 to be concentric with the core 1.

The clad 14 includes the inner cladding layer 12 adjacent to the outer circumference side (the outer circumference) of the core 1, and the outer cladding layer 13 formed on the outer circumference side (the outer circumference) of the inner cladding layer 12.

Figure 12:
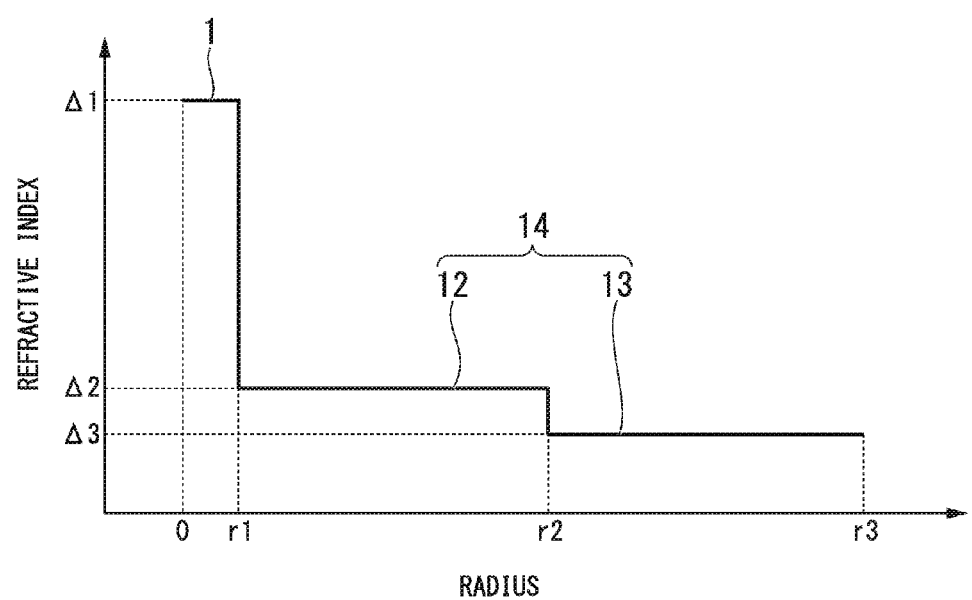
FIG. 12 is a diagram schematically showing a refractive index profile of the optical fiber shown in FIG. 11.

FIG. 12 schematically shows a refractive index profile of the optical fiber 20.

The refractive index of the core 1 is defined as Δ1, and the maximum refractive index of the core 1 is defined as Δ1max. The refractive index of the inner cladding layer 12 is defined as Δ2, and the minimum refractive index of the inner cladding layer 12 is defined as Δ2min. The refractive index of the outer cladding layer 13 is defined as Δ3.

In the optical fiber 20, Expression [10] described below is established as with the optical fiber 10 of the second embodiment.

Δ1max>Δ2min and Δ1max>Δ3 . . . [10] The optical fiber 20 is different from the optical fiber 10 of the second embodiment in that the minimum refractive index Δ2min of the inner cladding layer 12 is adjusted to be greater than the refractive index Δ3 of the outer cladding layer 13.

In the optical fiber 20, Expression [11] described below is established as with the optical fiber 10 of the second embodiment.

$$0.01\% < |\Delta 2min - \Delta 3| < 0.03\% \quad [11]$$

The absolute value of the difference between the Δ2min and Δ3 is adjusted to be in the range of Expression [11], and thus, the mode field diameter (MFD) is able to be optimized, the connection loss at the time of being connected to the other optical fiber is able to be suppressed to be low, and the bending loss is able to be reduced.

The outer circumference radius r1 of the core 1, the outer circumferential radius r2 of the inner cladding layer 12, and the outer circumferential radius r3 of the outer cladding layer 13 have relationships denoted by Expression [12] and Expression [13] described below, as with the optical fiber 10 of second embodiment.

$$r1 < r2 < r3 \quad [12]$$

$$0.2 \leq r1/r2 \leq 0.5 \quad [13]$$

r1/r2 is adjusted to be greater than or equal to 0.2, and thus the mode field diameter is able to be optimized, the connection loss at the time of being connected to the other optical fiber is able to be suppressed to be low, and the bending loss is able to be reduced.

In the optical fiber 20, the cut-off wavelength $\lambda c_{22m}$ of 22 m is less than or equal to 1260 nm, as with the optical fiber 10 of the second embodiment.

In addition, the mode field diameter (MFD) at a wavelength of 1310 nm is greater than or equal to 8.6 μm and less than or equal to 9.5 μm.

In the optical fiber 20, it is preferable that the loss increase at a wavelength of 1550 nm at the time of winding the optical fiber 20 around a cylindrical mandrel having a diameter of 15 mm 10 times be less than or equal to 0.25 dB. In addition, it is preferable that the loss increase at a wavelength of 1625 nm at the time of winding the optical fiber 20 around the cylindrical mandrel having a diameter of 15 mm 10 times be less than or equal to 1.0 dB.

The core 1, for example, is able to be configured of silica glass of which the refractive index increases by adding a dopant such as germanium (Ge).

The inner cladding layer 2, for example, is able to be configured of pure silica glass. In the inner cladding layer 2, for example, the refractive index may be adjusted by adding a dopant such as chlorine (Cl).

The outer cladding layer 3, for example, is able to be configured of pure silica glass. The outer cladding layer 3, for example, may be configured of silica glass of which the refractive index decreases by adding a dopant such as fluorine (F).

The optical fiber 20 is able to be manufactured by a modified chemical vapor deposition method, a plasma chemical vapor deposition method, a vapor-phase axial deposition method, an outside vapor deposition method, and the like, as with the optical fiber 10 of the second embodiment.

For example, in a case where the modified chemical vapor deposition method is adopted, the optical fiber preform is able to be prepared as follows.

A glass deposition layer which becomes the inner cladding layer 2 is formed on the inside of a silica glass tube (for example, a silica glass tube containing a dopant such as fluorine (F)) which becomes the outer cladding layer 3 by using a raw material such as pure silica glass.

Next, a glass deposition layer which becomes the core 1 is formed on the inside of the glass deposition layer, for example, by using a raw material containing a dopant such as germanium (Ge). Furthermore, the core 1 is able to be formed by using a core rod which is separately prepared.

The silica glass tube in which the glass deposition layer is formed becomes the optical fiber preform through a transparency step, a solidification step, and the like. The optical fiber preform is subjected to fiber drawing, and thus, the optical fiber 20 shown in FIG. 11 is able to be obtained.

In the optical fiber 20, a difference in the refractive indices between the inner cladding layer 12 and the outer cladding layer 13 is in the range described above (refer to Expression [11]), and a ratio of the outer circumferential radius of the core 1 and the outer circumferential radius of the inner cladding layer 12 is in the range described above (refer to Expression [13]), and thus, the connection loss at the time of being connected to the other optical fiber is able to be suppressed to be low, and the bending loss is able to be reduced.

In the optical fiber 20, the manufacturing method of the related art is able to be used without being considerably changed, and thus, the optical fiber 20 is able to be easily manufactured, and the manufacturing costs are able to be made low.

As described above, the second embodiment and the third embodiment of the present invention have been described, but the second embodiment and the third embodiment are examples of the present invention, and addition, omission, substitution, and other changes are able to be performed without departing from the range of the present invention.

For example, in the optical fibers 10 and 20 shown in FIG. 9 and FIG. 11, the clads 4 and 14 are formed of two cladding layers (the inner cladding layer and the outer cladding layer), and the clad may include layers other than the inner cladding layer and the outer cladding layer.

Hereinafter, a fourth embodiment and a fifth embodiment of the present invention will be described with reference to the drawings.

Figure 13:
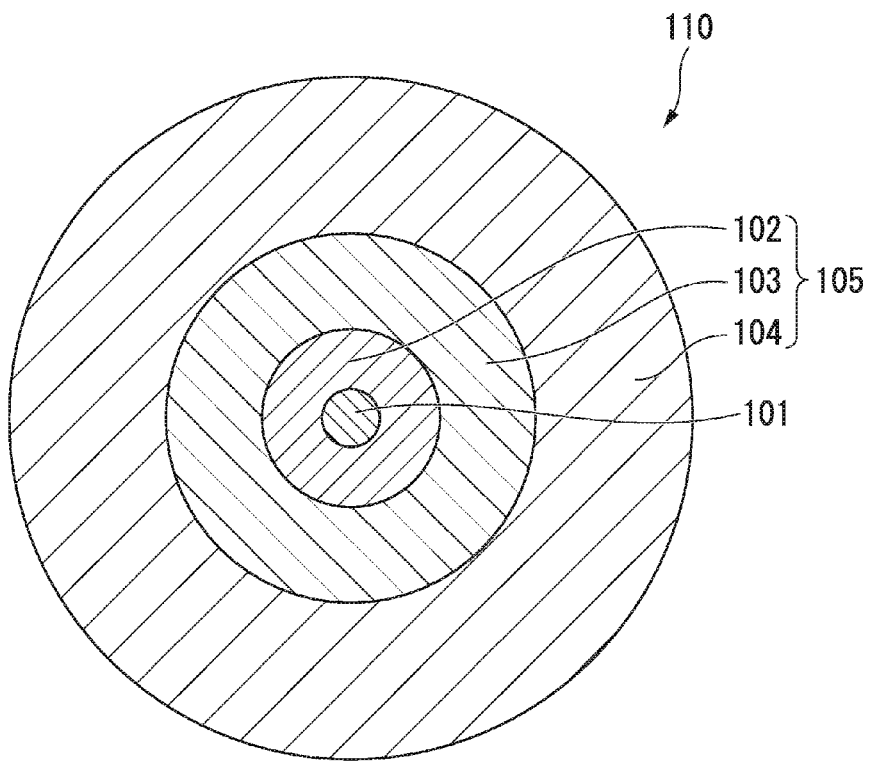
FIG. 13 is a sectional view schematically showing an optical fiber according to a fourth embodiment.

FIG. 13 shows a schematic configuration of an optical fiber 110 according to a fourth embodiment of the present invention.

The optical fiber 110 includes a core 101 disposed on the center portion, and a clad 105 disposed on the outer circumference side (the outer circumference) of the core 101 to be concentric with the core 101.

The clad 105 includes an inner cladding layer 102 adjacent to the outer circumference side (the outer circumference) of the core 101, a trench 103 formed to be adjacent to the outer circumference side (the outer circumference) of the inner cladding layer 102, and an outer cladding layer 104 formed on the outer circumference side (the outer circumference) of the trench 103.

Figure 14:
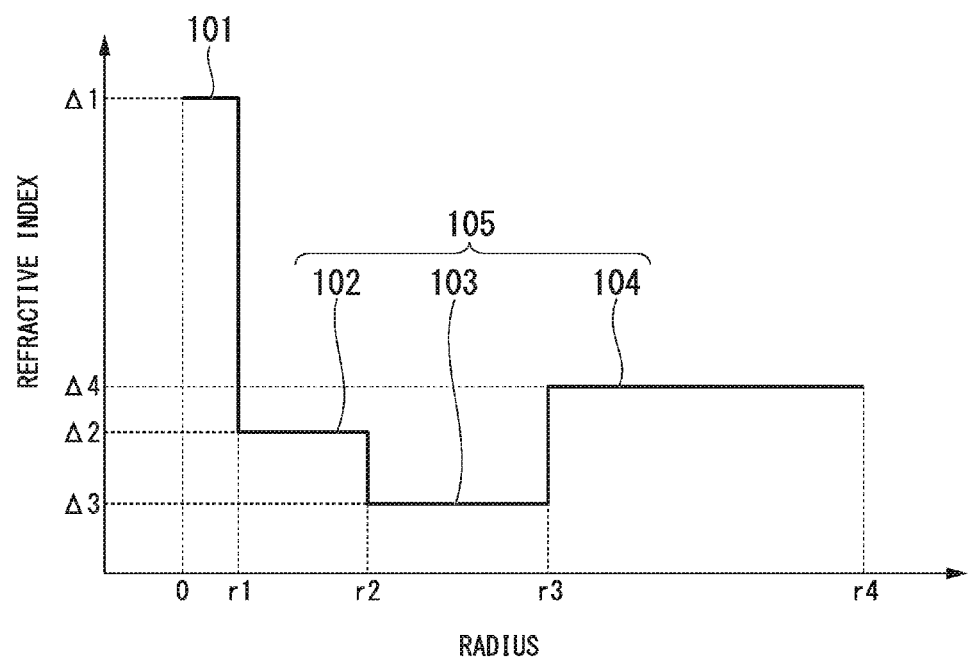
FIG. 14 is a diagram schematically showing a refractive index profile of the optical fiber shown in FIG. 13.

FIG. 14 schematically shows a refractive index profile of the optical fiber 110.

The refractive index of the core 101 is defined as $\Delta 1$, and the maximum refractive index of the core 101 is defined as $\Delta 1 \max$.

The refractive index of the inner cladding layer 102 is defined as $\Delta 2$, and the minimum refractive index of the inner cladding layer 102 is defined as $\Delta 2 \min$.

The refractive index of the trench 103 is defined as $\Delta 3$, and the minimum refractive index of the trench 103 is defined as $\Delta 3 \min$.

The refractive index of the outer cladding layer 104 is defined as $\Delta 4$.

The maximum refractive index $\Delta 1 \max$ of the core 101 is the refractive index of the core 101 which is maximized in a diameter direction range from the center of the core 101 to the outer circumference of the core 101. In the refractive index profile shown in FIG. 14, the refractive index $\Delta 1$ of the core 101 is constant without depending on the position of the diameter direction, and thus, the refractive index $\Delta 1$ is identical to the maximum refractive index $\Delta 1 \max$ in the entire range.

The minimum refractive index $\Delta 2 \min$ of the inner cladding layer 102 is the refractive index of the inner cladding layer 102 which is minimized in a diameter direction range from the inner circumference of the inner cladding layer 102 to the outer circumference of the inner cladding layer 102. In the refractive index profile shown in FIG. 14, the refractive index $\Delta 2$ of the inner cladding layer 102 is constant without depending on the position of the diameter direction, and thus, the refractive index $\Delta 2$ is identical to the minimum refractive index $\Delta 2 \min$ in the entire range.

The minimum refractive index $\Delta 3 \min$ of the trench 103 is the refractive index of the trench 103 which is minimized in a diameter direction range from the inner circumference of the trench 103 to the outer circumference of the trench 103. In the refractive index profile shown in FIG. 14, the refractive index $\Delta 3$ of the trench 103 is constant without depending on the position of the diameter direction, and thus, the refractive index $\Delta 3$ is identical to the minimum refractive index $\Delta 3 \min$ in the entire range.

In the optical fiber 110, Expression [14] described below is established.

$$\Delta 1 \max > \Delta 2 > \Delta 3 \min \quad [14]$$

As shown in Expression [14], the maximum refractive index $\Delta 1 \max$ of the core 101 is greater than the refractive index $\Delta 2$ of the inner cladding layer 102.

The refractive index $\Delta 2$ of the inner cladding layer 102 is greater than $\Delta 3 \min$ of the trench 103.

In the optical fiber 110, Expression [15] described below is further established.

$$\Delta 1 \max > \Delta 4 > \Delta 3 \min \quad [15]$$

As shown in Expression [15], the maximum refractive index $\Delta 1 \max$ of the core 101 is greater than the refractive index $\Delta 4$ of the outer cladding layer 104.

The refractive index $\Delta 4$ of the outer cladding layer 104 is greater than $\Delta 3 \min$ of the trench 103.

In the optical fiber 110, Expression [16] described below is further established.

$$0.01\% < (\Delta 4 - \Delta 3 \min) < 0.03\% \quad [16]$$

Expression [16] indicates that a difference between the refractive index $\Delta 4$ of the outer cladding layer 104 and the minimum refractive index $\Delta 3 \min$ of the trench 103 is greater than 0.01% and less than 0.03%.

When the difference between $\Delta 4$ and $\Delta 3 \min$ is excessively small, the bending loss may not be sufficiently reduced. In contrast, the difference between $\Delta 4$ and $\Delta 3 \min$ is excessively large, the mode field diameter decreases, and the connection loss at the time of being connected to the other optical fiber (for example, a general single mode optical fiber (SSMF)) may increase.

In the optical fiber 110, the difference between $\Delta 4$ and $\Delta 3 \min$ is in a range of greater than 0.01%, and thus, the bending loss is able to be reduced. In addition, the difference between $\Delta 4$ and $\Delta 3 \min$ is less than 0.03%, and thus, the mode field diameter (MFD) is able to be optimized, and the connection loss at the time of being connected to the other optical fiber is able to be suppressed to be low.

The outer circumferential radii of the core 101, the inner cladding layer 102, the trench 103, and the outer cladding layer 104 are respectively r1, r2, r3, and r4.

The outer circumference radius r1 of the core 101, the outer circumferential radius r2 of the inner cladding layer 102, the outer circumferential radius r3 of the trench 103, and the outer circumferential radius r4 of the outer cladding layer 104 have a relationship denoted by Expression [17] described below.

$$r1 \leq r2 < r3 < r4 \quad [17]$$

A ratio r2/r1 of the outer circumferential radius r2 of the inner cladding layer 102 to the outer circumference radius r1 of the core 101 is in a range denoted by Expression [18] described below.

$$1 \leq r2/r1 \leq 5 \quad [18]$$

When r2/r1 is excessively small, the bending loss may increase. In contrast, when r2/r1 is excessively large, the mode field diameter decreases, and the connection loss at the time of being connected to the other optical fiber (for example, SSMF) may increase.

In the optical fiber 110, r2/r1 is greater than or equal to 1, and thus, it is possible to reduce the bending loss. r2/r1 is less than or equal to 5, the mode field diameter is able to be optimized, and the connection loss at the time of being connected to the other optical fiber is able to be suppressed to be low.

A ratio r3/r2 of the outer circumferential radius r3 of the trench 103 to the outer circumferential radius r2 of the inner cladding layer 102 is in a range denoted by Expression [19] described below.

$$1 < r3/r2 \leq 2 \quad [19]$$

When r3/r2 is excessively small, the bending loss may increase. In contrast, when r3/r2 is excessively large, the mode field diameter decreases, and the connection loss at the time of being connected to the other optical fiber (for example, SSMF) may increase.

In the optical fiber 110, r3/r2 is greater than 1, and thus, it is possible to reduce the bending loss. r3/r2 is less than or equal to 2, and thus, the mode field diameter is able to be optimized, and the connection loss at the time of being connected to the other optical fiber is able to be suppressed to be low.

In the optical fiber 110, the cut-off wavelength $\lambda c_{22m}$ of 22 m is less than or equal to 1260 nm.

That is, Expression [20] described below is established.

$$\lambda c_{22m} \leq 1260 \text{ nm} \quad [20]$$

Accordingly, the regulation of ITU-T Recommendation G.652 is able to be satisfied.

The cut-off wavelength $\lambda c_{22m}$, for example, is able to be measured by a measurement method disclosed in ITU-T Recommendation G.650.

In the optical fiber 110, the refractive index and the outer circumferential radius described above are adjusted, and thus the mode field diameter (MFD) at a wavelength of 1310 nm is greater than or equal to 8.6 μm and less than or equal to 9.5 μm. That is, Expression [21] described below is established.

$$8.6 \text{ μm} \leq \text{MFD} \leq 9.5 \text{ μm} \quad [21]$$

The mode field diameter is in the range of Expression [21], and thus, the connection loss at the time of being connected to the other optical fiber (for example, SSMF) is able to be suppressed to be low.

In the optical fiber 110, the mode field diameter is in the range of Expression [21], and thus, the regulation of ITU-T G.652 is satisfied.

In the optical fiber 110, it is preferable that the loss increase at a wavelength of 1550 nm at the time of winding the optical fiber 110 around a cylindrical mandrel having a diameter of 15 mm 10 times be less than or equal to 0.25 dB.

In addition, it is preferable that the loss increase at a wavelength of 1625 nm at the time of winding the optical fiber 110 around the cylindrical mandrel having a diameter of 15 mm 10 times be less than or equal to 1.0 dB.

The core 101, for example, is able to be configured of silica glass of which the refractive index increases by adding a dopant such as germanium (Ge).

The inner cladding layer 102 and the trench 103, for example, are able to be configured of silica glass of which the refractive index decreases by adding a dopant such as fluorine (F).

The outer cladding layer 104, for example, is able to be configured of pure silica glass. In the outer cladding layer 104, the refractive index may be adjusted by adding a dopant (for example, Ge, F, and the like).

Each layer configuring the optical fiber 110 is able to be formed by a known method such as a modified chemical vapor deposition method, a plasma chemical vapor deposition method, a vapor-phase axial deposition method, and an outside vapor deposition method, or a combination thereof.

For example, in a case where the modified chemical vapor deposition method is adopted, the optical fiber preform is able to be prepared as follows.

A glass deposition layer which becomes the trench 103 is formed on the inside of the silica glass tube (for example, a glass tube formed of pure silica glass) which becomes the outer cladding layer 104, for example, by using a raw material containing a dopant such as fluorine (F).

A glass deposition layer which becomes the inner cladding layer 102 is formed on the inside of the glass deposition layer, for example, by using a raw material containing a dopant such as fluorine (F).

The refractive index of the trench 103 and the inner cladding layer 102 is able to be adjusted by the added amount of the dopant.

Next, a glass deposition layer which becomes the core 101 is formed on the inside of the glass deposition layer, for example, by using a raw material containing a dopant such as germanium (Ge). Furthermore, the core 101 is able to be formed by using a core rod which is separately prepared.

The silica glass tube in which the glass deposition layer is formed becomes the optical fiber preform through a transparency step, a solidification step, and the like. The optical fiber preform is subjected to fiber drawing, and thus, the optical fiber 110 shown in FIG. 13 is able to be obtained.

The chemical vapor deposition method is preferable from the viewpoint of accurately adjusting the refractive index profile by adding a dopant.

The vapor-phase axial deposition method and the outside vapor deposition method are also able to be applied to manufacture the optical fiber 110. The vapor-phase axial deposition method and the outside vapor deposition method have advantages such as high productivity.

In the optical fiber 110, a difference in the refractive indices between the trench 103 and the outer cladding layer 104 is in the range described above (refer to Expression [16]), and a ratio of the outer circumferential radius of the core 101, the outer circumferential radius of the inner cladding layer 102, and the outer circumferential radius of the trench 103 is in the range described above (refer to Expressions [18] to [20]), and thus, the connection loss at the time of being connected to the other optical fiber is able to be suppressed to be low, and the bending loss is able to be reduced.

It has been known that the refractive index of the clad in a portion close to the core considerably affects optical properties of the optical fiber, but as a result of intensive studies of the present inventor, a refractive index profile has been found in which the bending loss is able to be reduced without decreasing the mode field diameter.

By adopting the refractive index profile, the optical fiber 110 has technical meaning from the viewpoint of making suppression of the connection loss at the time of being connected to the other optical fiber and a reduction in the bending loss compatible.

In the optical fiber 110, the difference in the refractive indices between the trench 103 and the outer cladding layer 104 is small, and thus, the refractive index of the trench 103 and the outer cladding layer 104 is able to be easily and accurately adjusted by using the manufacturing method of the related art (for example, a general manufacturing method of SSMF) without considerably changing the method.

In addition, the difference in the refractive indices between the trench 103 and the outer cladding layer 104 is small, and thus, constraint based on the manufacturing method decreases. For example, not only the chemical vapor deposition method which is considered to be suitable for adjusting the refractive index profile, but also the vapor-phase axial deposition method, and the outside vapor deposition method are able to be adopted.

Accordingly, the optical fiber 110 is able to be easily manufactured, and manufacturing costs are able to be made low.

In the optical fiber 110, the difference in the refractive indices between the trench 103 and the outer cladding layer 104 is small, and thus, the added amount of the dopant such as fluorine (F) for forming the trench 103 is able to be reduced.

Raw material gas (for example, $SiF_4$) used in a dope such as fluorine (F) is expensive, and thus, raw material costs are able to be suppressed and manufacturing costs are able to be made low by reducing the added amount of the dopant.

As described above, the outer circumference radii r1 to r4 of the core 101, the inner cladding layer 102, the trench 103, and the outer cladding layer 104 have a relationship denoted by Expression [17].

$$r1 \leq r2 < r3 < r4 \quad [17]$$

In the optical fiber 110 shown in FIG. 13 and FIG. 14, r1, r2, and r3 are values different from each other, but the present invention includes a case of r1=r2 and r2≠r3.

Figure 15:
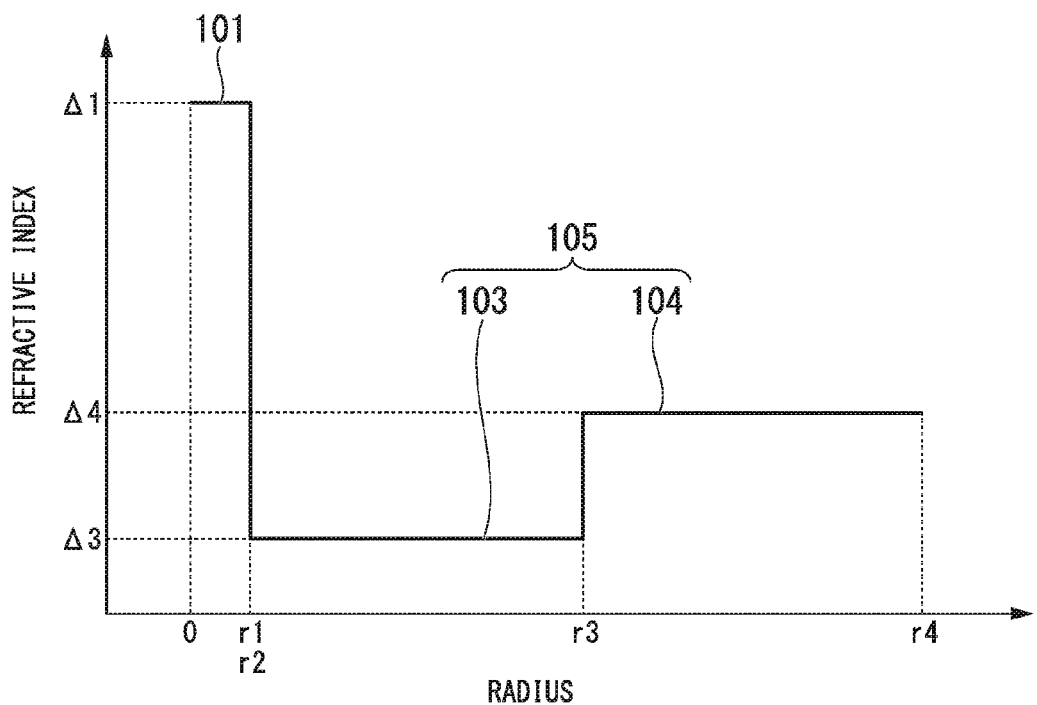
FIG. 15 is a diagram schematically showing a refractive index profile of an optical fiber according to a fifth embodiment.

FIG. 15 is a diagram of a refractive index profile of an optical fiber of a fifth embodiment of the present invention, and shows a case of r1=r2 and r2≠r3.

In the optical fiber, r1 is identical to r2, and thus, the clad 105 is formed only of the trench 103 and the outer cladding layer 104 formed on the outer circumference side of the trench 103.

As described above, the fourth embodiment and the fifth embodiment of the present invention have been described, but the fourth embodiment and the fifth embodiment are examples of the present invention, and addition, omission, substitution, and other changes are able to be performed without departing from the range of the present invention.

For example, in the optical fiber 110 shown in FIG. 13, the clad 105 is formed of three layers (the inner cladding layer, the trench, and the outer cladding layer), but the clad may include other layers.

As described above, the present invention has been described on the basis of the preferred embodiments, but the present invention is not limited to the embodiments described above, and various modifications are able to be performed in a range not departing from the present invention.

EXAMPLES

Hereinafter, the embodiments of the present invention will be specifically described on the basis of examples.

Properties such as a bending loss of an optical fiber having a pentagonal refractive index profile and an optical fiber having an α-th power refractive index profile were compared with each other. The bending loss is a parameter depending on a cable cut-off wavelength and MFD, and thus, in this example, the cable cut-off wavelength was 1.21 μm (1210 nm), and MFD at a wavelength of 1310 nm was in a range of 9.17 μm to 9.20 μm.

In order to set the cable cut-off wavelength and MFD to be constant, in the optical fiber having a pentagonal refractive index profile, a relative refractive index difference $\Delta 1a$ of the core center and a core radius r1 were adjusted. Similarly, in the optical fiber having an α-th power refractive index profile, a refractive index $n_1$ of the core center and a core radius a were adjusted. Each of the refractive index profiles of the core in this example is shown in FIG. 5A to FIG. 5I and FIG. 6A to FIG. 6I.

Figure 5A:
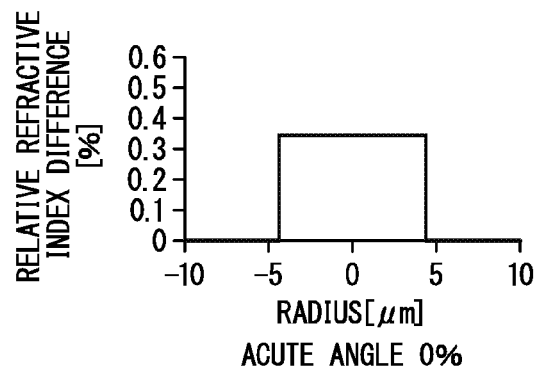
FIG. 5A is a specific example of a refractive index profile in a case of changing an acute angle.
Figure 5B:
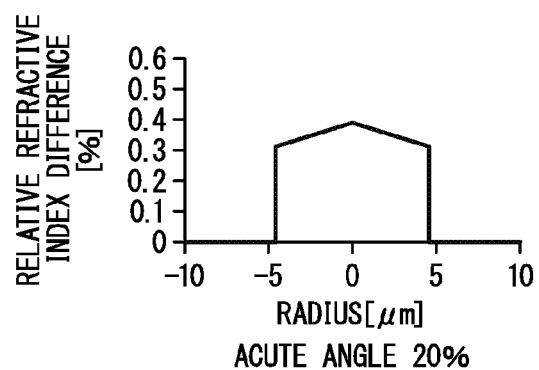
FIG. 5B is a specific example of a refractive index profile in a case of changing an acute angle.
Figure 5C:
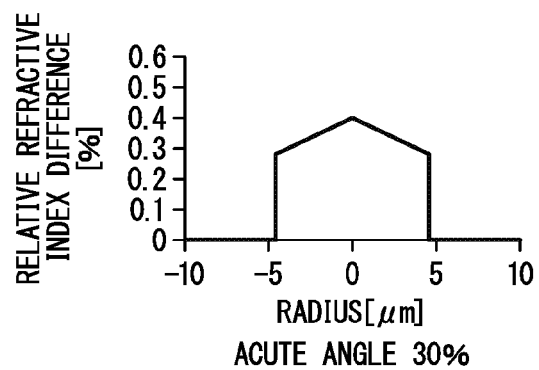
FIG. 5C is a specific example of a refractive index profile in a case of changing an acute angle.
Figure 5D:
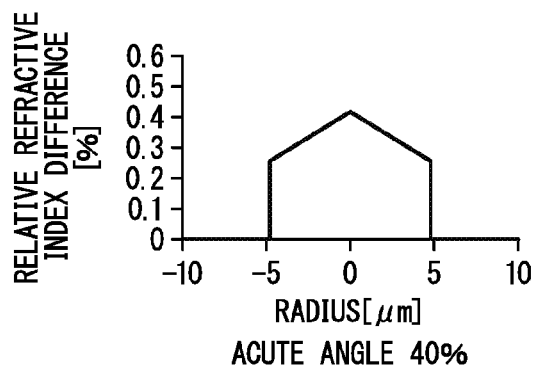
FIG. 5D is a specific example of a refractive index profile in a case of changing an acute angle.
Figure 5E:
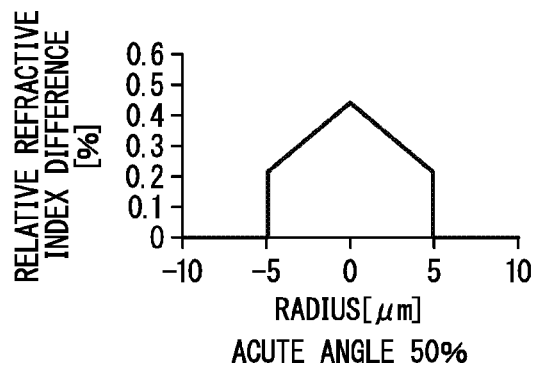
FIG. 5E is a specific example of a refractive index profile in a case of changing an acute angle.
Figure 5F:
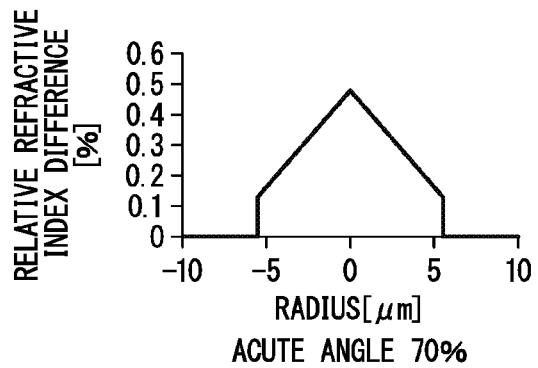
FIG. 5F is a specific example of a refractive index profile in a case of changing an acute angle.
Figure 5G:
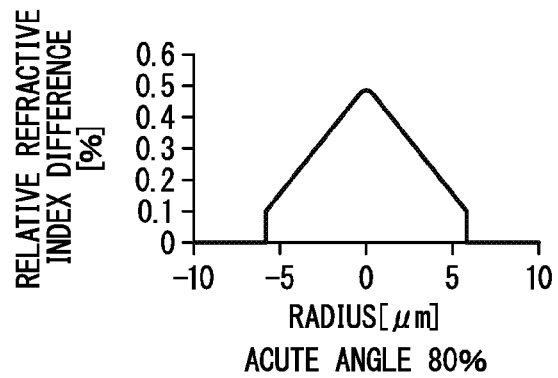
FIG. 5G is a specific example of a refractive index profile in a case of changing an acute angle.
Figure 5H:
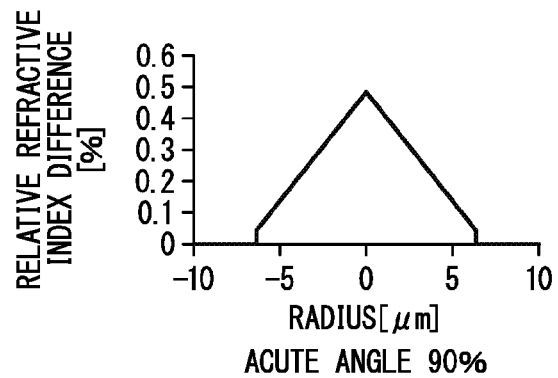
FIG. 5H is a specific example of a refractive index profile in a case of changing an acute angle.
Figure 5I:
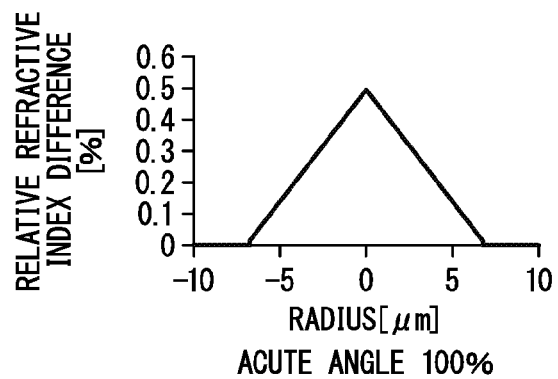
FIG. 5I is a specific example of a refractive index profile in a case of changing an acute angle.

FIG. 5A to FIG. 5I show a specific example of a refractive index profile in a case of changing the acute angle. FIG. 5A shows a case where the acute angle is 0%, FIG. 5B shows a case where the acute angle is 20%, FIG. 5C shows a case where the acute angle is 30%, FIG. 5D shows a case where the acute angle is 40%, FIG. 5E shows a case where the acute angle is 50%, FIG. 5F shows a case where the acute angle is 70%, FIG. 5G shows a case where the acute angle is 80%, FIG. 5H shows a case where an acute angle is 90%, and FIG. 5I shows a case where the acute angle is 100%.

Figure 6A:
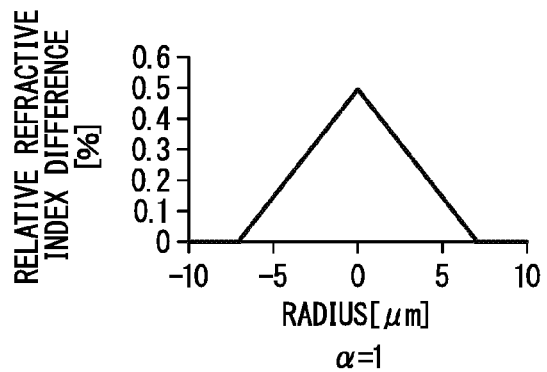
FIG. 6A is a specific example of a refractive index profile in a case of changing an α value.
Figure 6B:
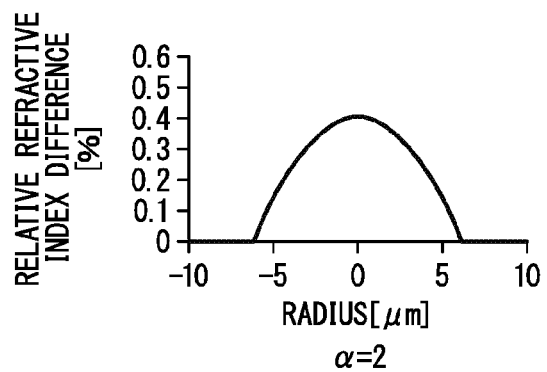
FIG. 6B is a specific example of a refractive index profile in a case of changing an α value.
Figure 6C:
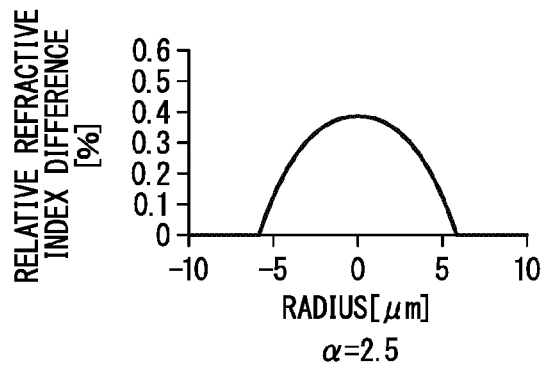
FIG. 6C is a specific example of a refractive index profile in a case of changing an α value.
Figure 6D:
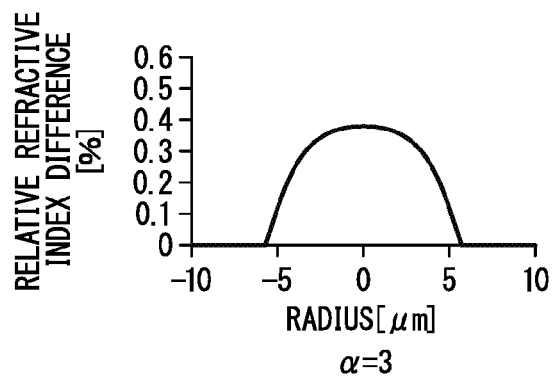
FIG. 6D is a specific example of a refractive index profile in a case of changing an α value.
Figure 6E:
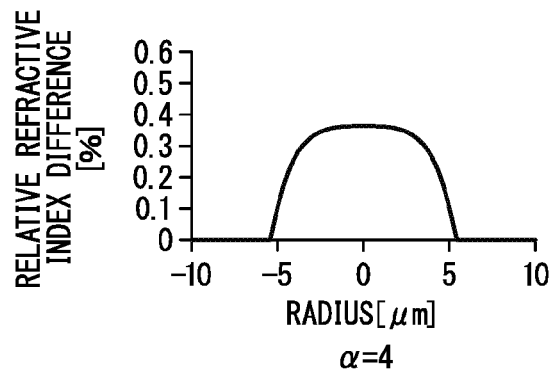
FIG. 6E is a specific example of a refractive index profile in a case of changing an α value.
Figure 6F:
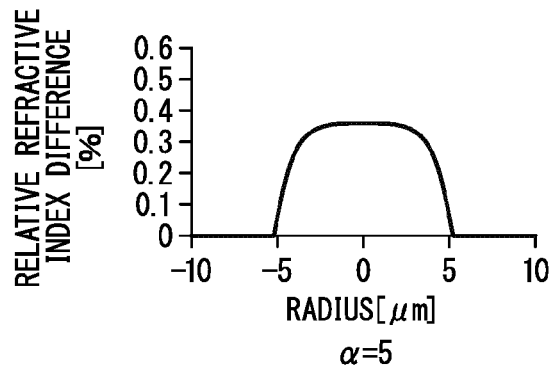
FIG. 6F is a specific example of a refractive index profile in a case of changing an α value.
Figure 6G:
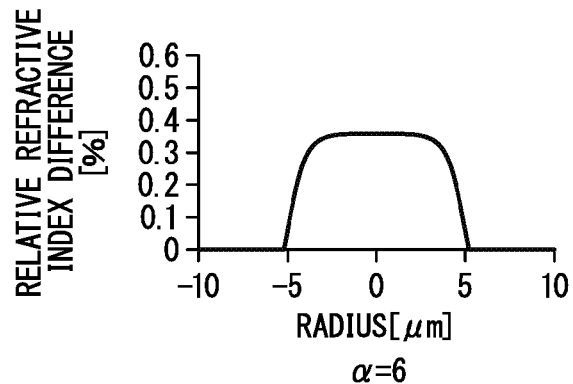
FIG. 6G is a specific example of a refractive index profile in a case of changing an α value.
Figure 6H:
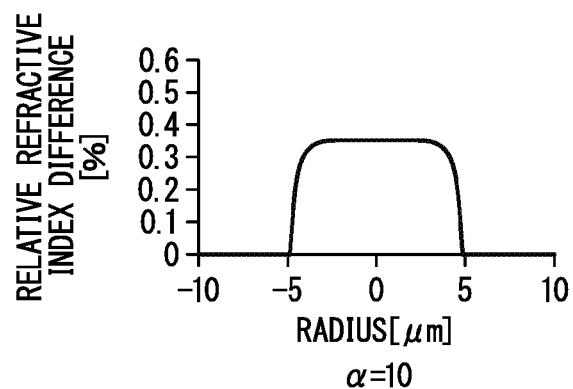
FIG. 6H is a specific example of a refractive index profile in a case of changing an α value.
Figure 6I:
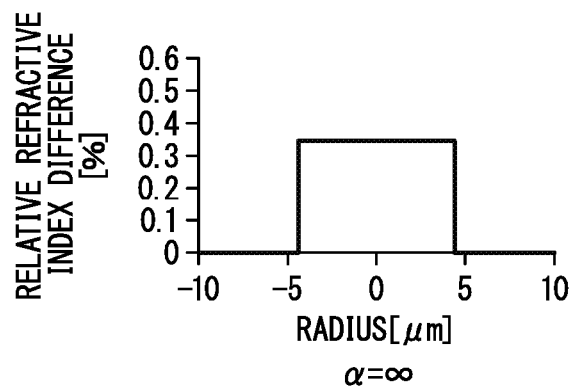
FIG. 6I is a specific example of a refractive index profile in a case of changing an α value.

FIG. 6A to FIG. 6I show a specific example of a refractive index profile in a case of changing an α value. FIG. 6A shows a case of α=1, FIG. 6B shows a case of α=2, FIG. 6C shows a case of α=2.5, FIG. 6D shows a case of α=3, FIG. 6E shows a case of α=4, FIG. 6F shows a case of α=5, FIG. 6G shows a case of α=6, FIG. 6H shows a case of α=10, and FIG. 6I shows a case of α=∞.

Figure 7:
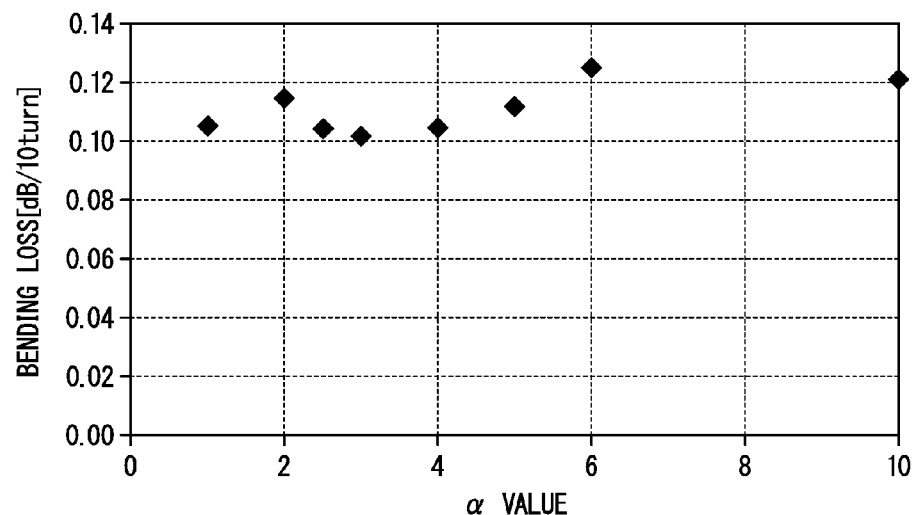
FIG. 7 is a graph showing an example of dependency of an α value with respect to a bending loss.
Figure 8:
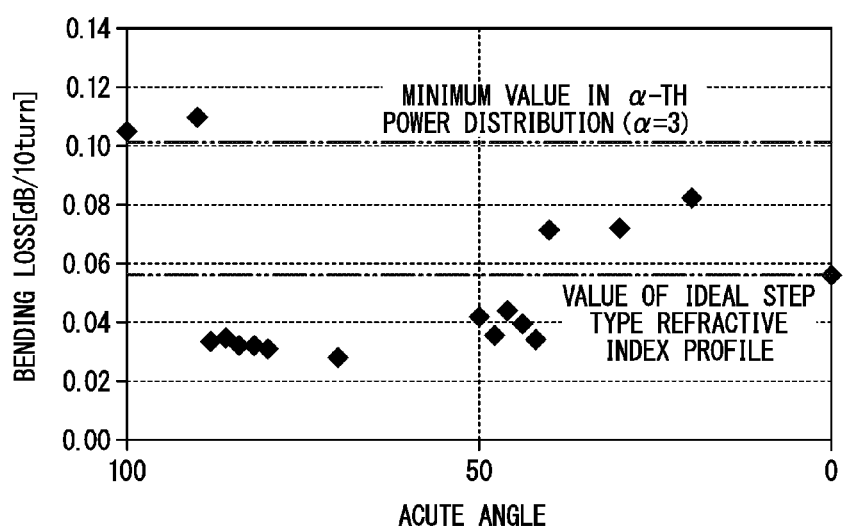
FIG. 8 is a graph showing an example of dependency of an acute angle with respect to a bending loss.

In addition, the values of the parameters of the optical fiber having a pentagonal refractive index profile are shown in Table 1. Further, numerical calculation was performed with respect to the optical fiber having the refractive index profile by a finite element method, and a bending loss at a wavelength of 1550 nm at the time of winding the optical fiber around a mandrel having a radial of 15 mm 10 times was calculated. The results are shown in FIG. 7, FIG. 8, and Table 1. FIG. 7 shows the result of the optical fiber having an α-th power refractive index profile. FIG. 8 and Table 1 show the result of the optical fiber having a pentagonal refractive index profile.

TABLE 1

| ACUTE ANGLE | Δ1a [%] | Δ1b [%] | r1 [μm] | BENDING LOSS [dB/10turn] |
|---|---|---|---|---|
| 0 | 0.35 | 0.35 | 4.50 | 0.055 |
| 20 | 0.38 | 0.31 | 4.55 | 0.082 |
| 30 | 0.40 | 0.28 | 4.65 | 0.071 |
| 40 | 0.42 | 0.25 | 4.78 | 0.071 |
| 42 | 0.43 | 0.25 | 4.81 | 0.034 |
| 44 | 0.43 | 0.24 | 4.84 | 0.039 |
| 46 | 0.44 | 0.24 | 4.88 | 0.044 |
| 48 | 0.44 | 0.23 | 4.92 | 0.035 |
| 50 | 0.44 | 0.22 | 4.95 | 0.042 |
| 70 | 0.48 | 0.14 | 5.45 | 0.028 |
| 80 | 0.49 | 0.10 | 5.84 | 0.031 |
| 82 | 0.49 | 0.09 | 5.94 | 0.032 |
| 84 | 0.49 | 0.08 | 6.04 | 0.032 |
| 86 | 0.50 | 0.07 | 6.14 | 0.035 |
| 88 | 0.50 | 0.06 | 6.25 | 0.033 |
| 90 | 0.50 | 0.05 | 6.36 | 0.110 |
| 100 | 0.51 | 0.00 | 6.90 | 0.105 |
| (REFERENCE) α = 3 | — | — | — | 0.102 |

In a specific example (within a range of $1 \leq \alpha \leq 10$) of the optical fiber having a α-th power distribution, a bending loss in a case of α=3 which is the minimum value at which the bending loss is minimized was obtained from FIG. 7. Then, in a range where the acute angle is less than or equal to 88%, a result in which the value of the bending loss of the optical fiber having a pentagonal refractive index profile is less than the value of the bending loss in a case of α=3 was obtained from FIG. 8. Further, in a range where the acute angle is 42% to 88%, a result in which the value of the bending loss of the optical fiber having a pentagonal refractive index profile is less than the value of the bending loss in a case of an ideal step type refractive index profile (corresponding to an acute angle of 0% and α=∞) was obtained.

Furthermore, the ideal step type refractive index profile is able to be imagined on design, but in practice, a fluctuation occurs in the refractive index of a core outer circumference portion or the like at the time of manufacturing, and thus, the manufacturing is considered to be difficult. Even though a constant refractive index is obtained in a core center portion, when a fluctuation occurs in the refractive index in the outer circumference portion, it is considered that the α value of an α-th power distribution is less than ∞, and the bending loss increases. For this reason, it is considered that the pentagonal refractive index profile according to this example is effective for reducing the bending loss.

What is claimed is:

1. An optical fiber, comprising:
 a core; and
 a clad surrounding an outer circumference of the core, the clad comprising an inner cladding layer adjacent to the outer circumference of the core and an outer cladding layer formed on an outer circumference of the inner cladding layer,
 wherein when a radius of the core is r1, a relative refractive index difference between a center of the core and the clad is a first relative refractive index difference $\Delta 1a$, and a relative refractive index difference between a position in which a distance from the center of the core in a radial direction is r1 and the clad is a second relative refractive index difference $\Delta 1b$,
 the first relative refractive index difference $\Delta 1a$ is greater than 0,
 the second relative refractive index difference $\Delta 1b$ is greater than 0,
 the first relative refractive index difference $\Delta 1a$ is greater than the second relative refractive index difference $\Delta 1b$,
 the first relative refractive index difference $\Delta 1a$ and the second relative refractive index difference $\Delta 1b$ satisfy a relationship denoted by the following expression:

$$0.20 \leq (\Delta 1a - \Delta 1b)/\Delta 1a \leq 0.88,$$

a refractive index profile $\Delta$ of the core in an entire region of a section of $0 \leq r \leq r1$ as a function $\Delta(r)$ of a distance r from the center of the core in the radial direction is denoted by the following expression:

$$\Delta(r) = \Delta 1a - (\Delta 1a - \Delta 1b)r/r1,$$

when a minimum refractive index of the inner cladding layer is $\Delta 2min$ and a refractive index of the outer cladding layer is $\Delta 3$, the minimum refractive index of the inner cladding layer $\Delta 2min$ and the refractive index of the outer cladding layer $\Delta 3$ satisfy a relationship denoted by the following expression:

$$0.01\% < |\Delta 2min - \Delta 3| < 0.03\%, \text{ and}$$

a ratio r1/r2 of the radius r1 of the core to a radius r2 of the inner cladding layer is in a range denoted by the following expression:

$$0.2 \leq r1/r2 \leq 0.5.$$

2. The optical fiber according to claim 1,
 wherein the first relative refractive index difference $\Delta 1a$ satisfies a relationship of $0.35\% < \Delta 1a \leq 0.50\%$.

3. The optical fiber according to claim 1,
 wherein the second relative refractive index difference $\Delta 1b$ satisfies a relationship of $0.06\% \leq \Delta 1b < 0.35\%$.

4. The optical fiber according to claim 1,
 wherein the radius r1 satisfies a relationship of $4.50\ \mu m < r1 \leq 6.25\ \mu m$.

5. The optical fiber according to claim 1,
 wherein a value of a bending loss at a wavelength of 1550 nm and a bending radius of 15 mm is less than or equal to 0.102 dB/10 turns.

6. The optical fiber according to claim 1,
 wherein the first relative refractive index difference $\Delta 1a$ and the second relative refractive index difference $\Delta 1b$ satisfy a relationship denoted by the following expression:

$$0.42 \leq (\Delta 1a - \Delta 1b)/\Delta 1a \leq 0.88.$$

7. The optical fiber according to claim 6,
 wherein a value of a bending loss at a wavelength of 1550 nm and a bending radius of 15 mm is less than or equal to 0.055 dB/10 turns.

8. The optical fiber according to claim 1,
 wherein a cable cut-off wavelength is less than or equal to 1260 nm.

9. The optical fiber according to claim 1,
 wherein a mode field diameter MFD at a wavelength of 1310 nm is in a range of $8.2\ \mu m \leq MFD \leq 9.9\ \mu m$.

10. A manufacturing method of the optical fiber according to claim 1,
 wherein glass configuring the core, or a part of glass configuring the core and glass configuring the clad, is prepared by an outside vapor deposition method or a chemical vapor deposition method at the time of preparing a preform of the optical fiber.

11. An optical fiber, comprising:
 a core; and
 a clad surrounding an outer circumference of the core, the clad comprising an inner cladding layer adjacent to the outer circumference of the core, a trench adjacent to an outer circumference of the inner cladding layer, and an outer cladding layer formed on an outer circumference of the trench,
 wherein when a radius of the core is r1, a relative refractive index difference between a center of the core and the clad is a first relative refractive index difference $\Delta 1a$, and a relative refractive index difference between a position in which a distance from the center of the core in a radial direction is r1 and the clad is a second relative refractive index difference $\Delta 1b$,
 the first relative refractive index difference $\Delta 1a$ is greater than 0,
 the second relative refractive index difference $\Delta 1b$ is greater than 0,
 the first relative refractive index difference $\Delta 1a$ is greater than the second relative refractive index difference $\Delta 1b$,
 the first relative refractive index difference $\Delta 1a$ and the second relative refractive index difference $\Delta 1b$ satisfy a relationship denoted by the following expression:

$$0.20 \leq (\Delta 1a - \Delta 1b)/\Delta 1a \leq 0.88,$$

a refractive index profile $\Delta$ of the core in an entire region of a section of $0 \leq r \leq r1$ as a function $\Delta(r)$ of a distance r from the center of the core in the radial direction is denoted by the following expression:

$$\Delta(r) = \Delta 1a - (\Delta 1a - \Delta 1b)r/r1,$$

when a maximum refractive index of the core is $\Delta 1max$, a refractive index of the inner cladding layer is $\Delta 2$, a minimum refractive index of the trench is $\Delta 3min$, and a refractive index of the outer cladding layer is $\Delta 4$, the maximum refractive index of the core $\Delta 1max$, the refractive index of the inner cladding layer $\Delta 2$, the minimum refractive index of the trench $\Delta 3min$, and the refractive index of the outer cladding layer $\Delta 4$ satisfy a relationship denoted by the following expression:

$$\Delta 1max > \Delta 2 > \Delta 3min,$$

$$\Delta 1max > \Delta 4 > \Delta 3min, \text{ and}$$

$$0.01\% < (\Delta 4 - \Delta 3min) < 0.03\%,$$

a ratio r2/r1 of a radius r2 of the inner cladding layer to the radius r1 of the core is in a range denoted by the following expression:

$$1 \leq r2/r1 \leq 5, \text{ and}$$

a ratio r3/r2 of a radius r3 of the trench to the radius r2 of the inner cladding layer is in a range denoted by the following expression:

$$1 < r3/r2 \leq 2.$$

12. A manufacturing method of the optical fiber according to claim 11,
wherein glass configuring the core, or a part of glass configuring the core and glass configuring the clad, is prepared by an outside vapor deposition method or a chemical vapor deposition method at the time of preparing a preform of the optical fiber.

13. An optical fiber, comprising:
a core; and
a clad surrounding an outer circumference of the core,
wherein when a radius of the core is r1, a relative refractive index difference between a center of the core and the clad is a first relative refractive index difference $\Delta 1a$, and a relative refractive index difference between a position in which a distance from the center of the core in a radial direction is r1 and the clad is a second relative refractive index difference $\Delta 1b$,
the first relative refractive index difference $\Delta 1a$ is greater than 0,
the second relative refractive index difference $\Delta 1b$ is greater than 0,
the first relative refractive index difference $\Delta 1a$ is greater than the second relative refractive index difference $\Delta 1b$,
the first relative refractive index difference $\Delta 1a$ and the second relative refractive index difference $\Delta 1b$ satisfy a relationship denoted by the following expression:

$$0.20 \leq (\Delta 1a - \Delta 1b)/\Delta 1a \leq 0.88,$$

a refractive index profile $\Delta$ of the core in an entire region of a section of $0 \leq r \leq r1$ as a function $\Delta(r)$ of a distance r from the center of the core in the radial direction is denoted by the following expression:

$$\Delta(r) = \Delta 1a - (\Delta 1a - \Delta 1b) r/r1,$$

the first relative refractive index difference $\Delta 1a$ satisfies a relationship of $0.48\% < \Delta 1a \leq 0.50\%$,
an acute angle is defined by the following expression:

$$A = \frac{\Delta 1a - \Delta 1b}{\Delta 1a}, \text{ and}$$

the acute angle is in a range of 70% to 88%.

14. A manufacturing method of the optical fiber according to claim 12,
wherein glass configuring the core, or a part of glass configuring the core and glass configuring the clad, is prepared by an outside vapor deposition method or a chemical vapor deposition method at the time of preparing a preform of the optical fiber.

* * * * *